(12) United States Patent
Clune et al.

(10) Patent No.: US 7,369,977 B1
(45) Date of Patent: May 6, 2008

(54) SYSTEM AND METHOD FOR MODELING TIMEOUTS IN DISCRETE EVENT EXECUTION

(75) Inventors: Michael I. Clune, Natick, MA (US); Michael H. McLernon, Attleboro, MA (US); Meera Ramaswamy, Westborough, MA (US); Atul Suri, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 423 days.

(21) Appl. No.: 11/010,148

(22) Filed: Dec. 10, 2004

Related U.S. Application Data

(60) Provisional application No. 60/611,574, filed on Sep. 20, 2004.

(51) Int. Cl.
G06F 9/455 (2006.01)

(52) U.S. Cl. .................. 703/6; 703/1; 703/14; 703/16; 703/21; 370/445; 370/227; 370/386; 705/7; 705/1

(58) Field of Classification Search .................... 703/6, 703/16, 14, 21; 370/227, 386, 445; 705/7, 705/1; 702/183; 379/15.01
See application file for complete search history.

(56) References Cited

U.S. PATENT DOCUMENTS

| | | | | |
|---|---|---|---|---|
| 4,965,743 A | * | 10/1990 | Malin et al. .................. 706/45 |
| 4,985,860 A | | 1/1991 | Vlach |
| 5,133,045 A | * | 7/1992 | Gaither et al. ................ 706/46 |
| 5,247,651 A | * | 9/1993 | Clarisse ........................ 703/13 |
| 5,440,719 A | * | 8/1995 | Hanes et al. .................. 703/21 |
| 5,701,439 A | * | 12/1997 | James et al. .................. 703/17 |
| 6,377,543 B1 | * | 4/2002 | Grover et al. ............... 370/227 |
| 6,650,731 B1 | * | 11/2003 | Steltner et al. .......... 379/15.01 |
| 6,882,965 B1 | * | 4/2005 | Hoover ......................... 703/14 |
| 2001/0053991 A1 | * | 12/2001 | Bonabeau ....................... 705/7 |
| 2002/0059054 A1 | * | 5/2002 | Bade et al. .................... 703/20 |
| 2003/0177018 A1 | * | 9/2003 | Hughes .......................... 705/1 |
| 2004/0017804 A1 | * | 1/2004 | Vishnu ........................ 370/386 |
| 2004/0073404 A1 | * | 4/2004 | Brooks et al. ............... 702/183 |
| 2004/0193393 A1 | * | 9/2004 | Keane .......................... 703/16 |
| 2004/0230404 A1 | * | 11/2004 | Messmer et al. .............. 703/1 |
| 2005/0060129 A1 | * | 3/2005 | Mosterman et al. ........... 703/2 |
| 2005/0111477 A1 | * | 5/2005 | Ghanma et al. ............. 370/445 |
| 2005/0154625 A1 | * | 7/2005 | Chua et al. .................... 705/7 |
| 2005/0177353 A1 | * | 8/2005 | Slater ............................ 703/6 |

OTHER PUBLICATIONS

Moure et al., "The Kscalar simulator", ACM, 2002.*
Bortscheller et al., "Model reusability in graphical simulation packages", Winter simulation conference, 1992.*
Gordon et al., "Hierarchical modeling in a graphical simulation system", Winter simulation conference, 1990.*

(Continued)

*Primary Examiner*—Paul Rodriguez
*Assistant Examiner*—Kandasamy Thangavelu
(74) *Attorney, Agent, or Firm*—Lahive & Cockfield, LLP

(57) ABSTRACT

A system and method models regional timeout functionality in a discrete event execution environment. A timeout function is initiated associated with an entity upon occurrence of a start condition and terminated or reset upon reaching an end condition. The timeout function is configured to expire after a selected amount of time. Upon expiration of the timeout function, the entity is redirected to a predetermined location for timeout processing.

84 Claims, 15 Drawing Sheets

OTHER PUBLICATIONS

Clymer, J.R., "Optimizing production workflows using OPEMCSS", Winter simulation conference, 2000.*
Anylogic User's Manual. *XJ Technologies Company Ltd.* 1992-2004; pp. 2-4, 8-9, 21-3, 41-3, 55-7, 155-6, 218-21, 270-1.
Chen, G., et al. "Lookahead, rollback and lookback: Searching for parallelism in discrete event simulation."
Clune, M., et al. "Panel session on Challenges and solution techniques for hybrid simulation." 43rd IEEE Conference on Decision and Control, Dec. 14, 2004.
Connell, J., et al. "Early hardware/software integration using SystemC 2.0."
EXTEND™ Users Manual. "Simulation software for the new millennium." Chapters 1-5, pp. 35-156; Appendix F, pp. 579-662.
Fall, K., et al. "The *ns* manual (formerly ns notes and documentation)." *The VINT Project.* Apr. 14, 2005; Chapters 4-8, pp. 37-85, Chapter 11, pp. 110-114.
Fujimoto, R. "Parallel discrete event simulation." *Communications of the ACM.* Oct. 1-8, 1990.
"Fundamentals of VHDL-AMS for high-speed buffer modeling." *Mentor Graphics Corporation.* 2002; 1-62.
"Graphical design environment for CAMeL-Tools." http://wwwcs.uni-paderborn.de/SFB376/projects/c1/Paper/vcamel.html. Sep. 18-20, 1996; 1-10.
Haverinen, A., et al. "White paper for SystemC™ based SoC communication modeling for the OCP™ protocol." Oct. 14, 2002; 1-39.
Henricksson, D., et al. "TrueTime 1.2—Reference Manual." Oct. 2004; 7-79.
Holz, E. "SDL-2000 Tutorial." *Formal Methods Europa.* Mar. 2001; 1-49.
"IEC 1131 Sequential Function Charts." http://www.software.rockwell.com/corporate/reference/iec1131/sfc.cfm?print=1. 1-2.
"Introduction to VHDL—A Tutorial." http://www.hzeeland.nl/~wrijker/dsy/vhdl/algemvhdl/fcmi/vhdlintro.htrm. 1-16.
Liu, J., et al. "Component-based hierarchical modeling of systems with continuous and discrete dynamics." *CACSD '00.* Sep. 25, 2000; 1-10.
Liu, J., et al. "Actor-oriented control system design: A Responsible framework perspective." *IEEE Transactions on Control Systems Technology.* Mar. 2004; 12(2):250-62.
Liu, J., et al. "Motivating hierarchical run-time models for measurement and control systems." *Ptolemy Miniconference,* Berkeley, CA. Mar. 22-23, 2001; 1-3.
Liu, J., et al. "System-level modeling of continuous and discrete dynamics." *Ptolemy Miniconference,* Berkeley, CA. Mar. 22-23, 2001; 1-4.
Martin, D.E., et al. "Analysis and simulation of mixed-technology VLSI systems." *Journal of Parallel and Distributed Computing.* 2002; 62:468-93.
Martin, R.C. "UML tutorial: Sequence diagrams." *Engineering Notebook Column.* Apr. 1998; 1-5.
"Meta issues." http://www.eda.org/vhdl-ams/ftp_files/lang_design/BRC/CRR15_Metaissues.txt. 1-10.
Mosterman, P.J., et al. "Modeling petri nets as local constraint equations for hybrid systems using Modelica™." 1-6.
Murata, T. "Petri nets: Properties, analysis and applications." *Proceedings of the IEEE.* Apr. 1989; 77(4):541-80.
"OPNET Modeler Accelerating Network R&D." *OPNET Technologies, Inc.* 1-4.
Overhauser, D., et al. "Evaluating mixed-signal simulators." *IEEE.* 1995; 113-20.
Overhauser, D., et al. "IDSIM2: An Environment for mixed-mode simulation." *IEEE.* 1990; 5.2.1-4.
"Parallel discrete event simulation." http://www.rpi.edu/~gucluh/pdes.html. 1-4.
Parumalla, K., et al. "Using reverse circuit execution for efficient parallel simulation of logic circuits." 1-9.
"Ptolemy II Frequently Asked Questions." http://ptolemy.eecs.berkeley.edu/ptolemyII/ptIIfaq.html. 1-10.

"Sequential Function Charts." Chapter 20, 20.1-20.25.
Siegmund, R., et al. "Efficient modeling and simulation of data communication protocols in communication-oriented designs using the SystemC$^{SV}$ extension." *Chemitz University of Technology.* 1-20.
"SIMUL8 Feature Tour." http://simul8-online.com/products/features/html. 1-2.
"SIMUL8 Professional." http://simul8-online.com/products/s8prof.html. 1-2.
"Specification and description language (SDL)." *The International Engineering Consortium.* 1-20.
System C Version 2.0 Users Guide. "Update for SystemC 2.0.1." 1996-2002; Chapter 1, pp. 1-8; Chapters 2, pp. 9-38; Chapters 5, pp. 71-82.
System C. "Transaction level modeling with SystemC." 1-26.
"The Almagest. vol. 1—Ptolgemy 0.7 User's Manual." *Ptolemy.* Mar. 3, 1997; Sections 1.4-1.9, 2.5-2.8, 4.9, 9.1-9.5, 12.1-12.4, 16.1, 16.3.
"The Network Simulator—ns-2." http://www.isi.edu/nsnam/ns/html. 1-2.
Vlach, M. "Modeling and simulation with Saber." *IEEE.* 1990; T-11.1-11.9.
Zeigler, B.P., et al. "Creating simulations in HLA/RTI using the DEVS modeling framework." *DEVS/HLA Tutorial.* 1998; 1-18.
Chen, G., et al. "Lookahead, rollback and lookback: Searching for parallelism in discrete event simulation." unknown date.
Connell, J., et al. "Early hardware/software integration using SystemC 2.0." date unkwown.
EXTEND™ Users Manual. "Simulation software for the new millennium." Chapters 1-5, pp. 35-156; Appendix F, pp. 579-662, unknown date.
"IEC 1131 Sequential Function Charts." http://www.software.rockwell.com/corporate/reference/iec1131/sfc.cfm?print=1. 1-2, unknown date.
"Introduction to VHDL—A Tutorial." http://www.hzeeland.nl/~wrijker/dsy/vhdl/algemvhdl/fcmi/vhdlintro.htrm. 1-16, unknown date.
"Meta issues." http://www.eda.org/vhdl-ams/ftp_files/lang_design/BRC/CRR15_Metaissues.txt. 1-10, unknown date.
Mosterman, P.J., et al. "Modeling petri nets as local constraint equations for hybrid systems using Modelica™." 1-6, unknown date.
"OPNET Modeler Accelerating Network R&D." *OPNET Technologies, Inc.* 1-4, unknown date.
"Parallel discrete event simulation." http://www.rpi.edu/~gucluh/pdes.html. 1-4, unknown date.
Parumalla, K., et al. "Using reverse circuit execution for efficient parallel simulation of logic circuits." 1-9, unknown date.
"Ptolemy II Frequently Asked Questions." http://ptolemy.eecs.berkeley.edu/ptolemyII/ptIIfaq.html. 1-10, unknown date.
"Sequential Function Charts." Chapter 20, 20.1-20.25, unknown date.
Siegmund, R., et al. "Efficient modeling and simulation of data communication protocols in communication-oriented designs using the SystemC$^{SV}$ extension." *Chemitz University of Technology.* 1-20, unknown date.
"SIMUL8 Feature Tour." http://simul8-online.com/products/features/html. 1-2, unknown date.
"SIMUL8 Professional." http://simul8-online.com/products/s8prof.html. 1-2, unknown date.
"Specification and description language (SDL)." *The International Engineering Consortium.* 1-20, unknown date.
System C. "Transaction level modeling with SystemC." 1-26, unknown date.
"The Network Simulator—ns-2." http://www.isi.edu/nsnam/ns/html. 1-2, unknown date.
Zeigler, B.P., et al. "Creating simulations in HLA/RTI using the DEVS modeling framework." *DEVS/HLA Tutorial.* 1998; 1-18.

* cited by examiner

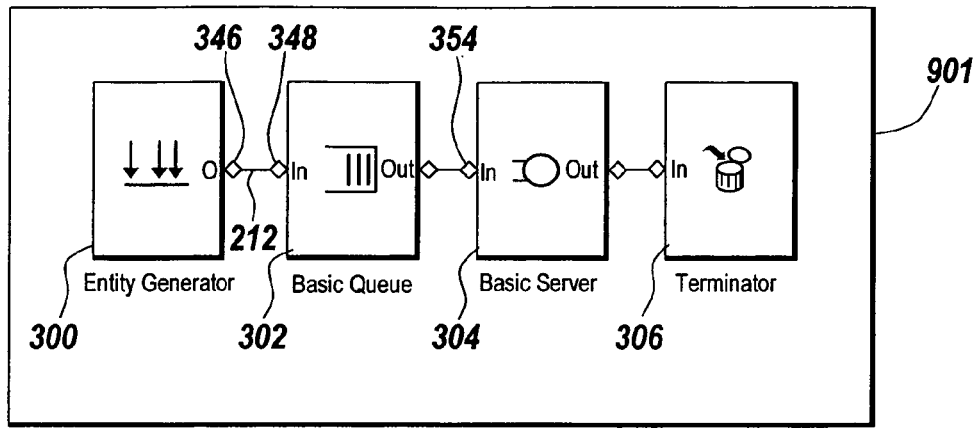
Fig. 8
| Time of Event (s) | Type of Event |
|---|---|
| 0.9 | Entity Generator block generates an entity |
Fig. 9
| Time of Event (s) | Type of Event |
|---|---|
| 1.7 | Entity Generator block generates second entity |
| 2.2 | Basic Server block completes service on the first entity |
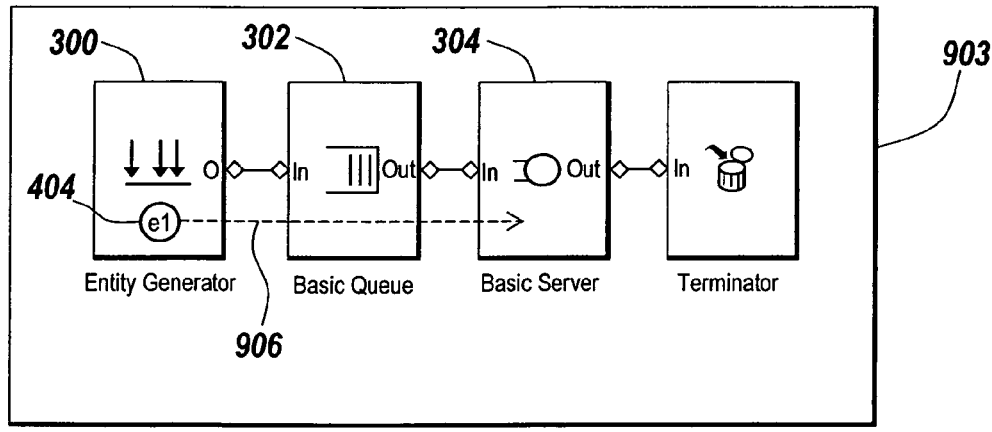
Fig. 10

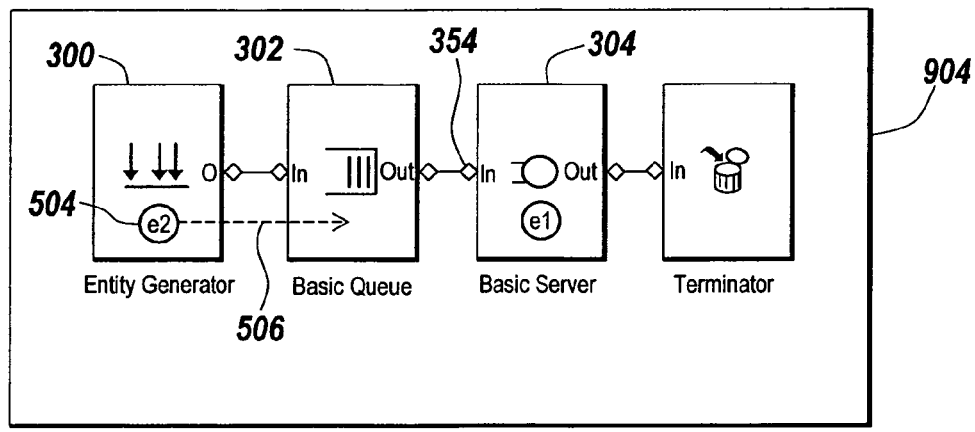
*Fig. 11*
| Time of Event (s) | Type of Event |
|---|---|
| 2.2 | Basic Server block completes service on the first entity |
| 3.8 | Entity Generator block generates the third entity |
*Fig. 12*
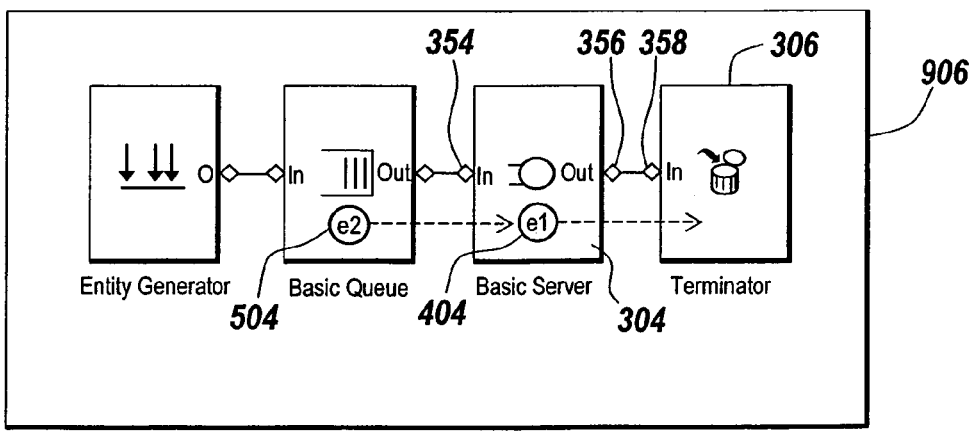
*Fig. 13*

| Time of Event (s) | Type of Event |
|---|---|
| 3.8 | Entity Generator block generates the third entity |
| 4.2 | Basic Server block completes service on the second entity |

| Time of Event (s) | Type of Event |
|---|---|
| 3.9 | Entity Generator block generates the fourth entity |
| 4.2 | Basic Server block completes service on the second entity |

| Time of Event (s) | Type of Event |
|---|---|
| 4.2 | Basic Server block completes service on the second entity |
| 6 | Entity Generator block generates the fifth entity |

909

| Time of Event (s) | Type of Event |
|---|---|
| 4.9 | Basic Server block completes service on the third entity |
| 6 | Entity Generator block generates the fifth entity |

*Fig. 19*

| Time of Event (s) | Type of Event |
|---|---|
| 2.1 | Entity Generator block generates the first entity |
| 2.1 | Entity Generator block generates the second entity |
| 2.3 | Basic Server block completes service |

*Fig. 20*

| Time of Event (s) | Type of Event | Priority |
|---|---|---|
| 2.1 | Entity Generator block generates the first entity | 1 |
| 2.1 | Entity Generator block generates the second entity | 2 |
| 2.3 | Basic Server block completes service of third entity | 3 |

SYSTEM AND METHOD FOR MODELING TIMEOUTS IN DISCRETE EVENT EXECUTION

RELATED APPLICATION

This application claims priority to, and the benefit of, co-pending U.S. Provisional Application No. 60/611,574, filed on Sep. 20, 2004, for all subject matter common to both applications. The disclosure of the above-mentioned application is hereby incorporated by reference herein in its entirety.

FIELD OF THE INVENTION

The present invention is related to timeout processing, and more particularly to the provision of timeout functionality in a graphical discrete event execution environment.

BACKGROUND

Generally, graphical analysis, simulation, and execution methods are used in modeling, design, analysis, and synthesis of engineered systems. These methods provide a visual representation of a model, such as a block diagram. The visual representation provides a convenient interpretation of model components and structure. The visual representation also provides a quick intuitive notion of system behavior. The components of a block diagram can also capture the mathematical representation of the actual system being modeled.

Historically, time-based block diagram models have been used in scientific areas, such as Feedback Control Theory and Signal Processing. Time-based block diagrams are used to study, design, debug, and refine dynamic systems representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, and the like.

Professionals from diverse areas such as engineering, science, education, and economics build mathematical models of dynamic systems to better understand system behavior as it changes with the progression of time. The mathematical models aid in building better systems, which can be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may serve to educate users on the basic principles governing physical systems. The models and results are often used as a scientific communication medium between humans. The term "model-based design" refers to the use of graphical models in the analysis, development, validation, and operation of dynamic systems.

Dynamic systems are typically modeled in modeling environments as sets of differential, difference, and/or algebraic equations. At any given instant of time, these equations may be viewed as relationships between the system's output response ("outputs"), the system's input stimuli ("inputs") at that time, the current state of the system, the system parameters, and time.

Time-based block diagram modeling has become particularly attractive over the last few years with the advent of software packages to process large amounts of data and perform a high number of computational iterations. In fact, various classes of graphical models enable a user to describe a system and related computations that can be performed on application specific computational hardware, such as a computer, microcontroller, FPGA, or custom hardware. Classes of such graphical models include time-based block diagram execution applications such as Simulink® from the MathWorks, Inc. Natick Mass., and state-based flow diagram execution applications such as Stateflow® from the MathWorks, Inc. Natick Mass., in addition to other models such as data flow diagrams, UML, VHDL, analog extension, and the like.

A common characteristic among these various forms of block diagram execution applications is that they define semantics of how to execute the diagram, and thus they specify how to model a dynamic system. Such applications provide sophisticated software platforms with a rich suite of support tools that make the analysis and design of dynamic systems efficient, methodical, and cost-effective. Furthermore, such applications can support the modeling of linear and nonlinear systems. They systems may be modeled in continuous time, sampled (or discrete) time, or a hybrid of continuous and discrete time. Systems can also be multirate, i.e., have different parts that are sampled or updated at different rates.

Time can be an inherited component of block diagram execution applications in that the results of a block diagram execution are dependent on time and as such, vary with time. In other words, a block diagram execution or model represents the instantaneous behavior of a dynamic system and models that system over time. Determining a system's behavior over time requires repeatedly executing a model of the system at intervals, called time steps, from the start of the time span to the end of the time span.

Systems may be categorized by the type of time step being used (fixed-step or variable-step). A fixed-step system is one that uses a fixed-step solver. A variable-step system is one that uses a variable-step solver. A solver is a module of the execution engine that is responsible for performing two tasks: (1) determining how far execution time should be advanced between consecutive passes through a system in order to accurately trace the system's outputs, and (2) integrating the derivative of the states of the system to obtain the actual states. Based on how solvers perform the first task, they are generally classified into two basic classes: Fixed-step solvers or Variable-step solvers. Fixed-step solvers often use explicit methods to compute the next continuous state at fixed periodic intervals of time. A variable-step solver can use either implicit or explicit methods to compute the next continuous state at non-periodic intervals of time. Generally, variable-step solvers use a form of error control to adjust the interval size such that the desired error tolerances are achieved.

Solvers can also be categorized into two classes with respect to time: continuous-time solvers and discrete-time solvers. Continuous-time solvers use numerical integration to compute a model's continuous states at the current time step from the states at previous time steps and the state derivatives. Continuous-time solvers rely on the model's blocks to compute the values of the model's discrete states at each time step. Mathematicians have developed a wide variety of numerical integration techniques for solving the ordinary differential equations (ODEs) that represent the continuous states of dynamic systems. Continuous-time solvers can further be separated into fixed-step continuous-time solvers and variable-step continuous-time solver. Discrete-time solvers exist primarily to solve purely discrete models. They compute the next execution time step for a model and nothing else. They do not compute continuous states and they rely on the model's blocks to update the model's discrete states. Similarly, discrete-time solvers can also be further separated into fixed-step discrete-time solvers and variable-step discrete-time solvers.

Simulink® is an example of an interactive graphical modeling tool that enables users to quickly create, model, simulate, and test block diagram representations of dynamic systems. Simulink® uses time-dependent models. It is suitable for simulating time-varying systems. FIG. 1 shows an example of a Simulink® model. The Simulink® model makes use of blocks and arrows to connect the blocks, when forming the model. Each arrow connecting one enabled block to another represents a signal having a value at all times. The arrow indicates the direction of the signal as the signal varies with time.

In time-based models, in order to know what happens with the system at a specific time in the future (such as at time equals 1000 seconds) the model must be initiated at a time of n seconds, where n is less than 1000 and the behavior at time n is known, and stepped through time to arrive at the 1000 second mark. For example, the model can be executed as follows in accordance with one example implementation embodiment. Input signal 100 generates an input signal and sends the signal to a Sum block 102 via link 110. Sum block 102 adds the signal from link 110 and a second link 116 and outputs the result in the form of link 112. At execution start time, link 116 has a signal of value zero. Integrator block 104 takes the signal from link 112 and performs integration on the input signal and outputs the result through link 114. Link 114 communicates the signal from the Integrator block 104 to a Scope block 108 for display, and also sends the signal to Gain block 106 through 116. Gain block 106 performs calculation on the input signal from link 114 and outputs the result through link 118 back to the Sum block 102. The Sum block 102 adds the signal from link 110 and the new updated signal from link 118 and outputs the result through link 112 to the Integrator block 104. The Integrator block 104 takes the updated signal from link 112 and performs integration on the value forwarded by the signal to produce an updated output on link 114. The model continues on until a predetermined condition is achieved, a time period is attained, or the user interrupts the execution.

Dynamic systems can also be modeled from a state-based perspective. The state of the system may be thought of as a numerical representation of the dynamically changing configuration of the system. For instance, in a model of a simple pendulum, the state may be viewed as the current position and velocity of the pendulum. Similarly, in a model of a signal-processing system that filters a signal the state would be a set of previous inputs. The system parameters are the numerical representation of the static, or unchanging, configuration of the system and may be viewed as constant coefficients in the equations modeling the system. For the pendulum example, a parameter is the length of pendulum: for the filter example, a parameter is the values of the filter taps.

Stateflow® is an example of a state-based dynamic system modeling application. Stateflow® is configured as a tool in Simulink® that can be used to design embedded systems that contain control, supervisory, or mode logic. By using Stateflow® with Simulink®, users can create models that combine state transition behavior (for example, fault detection or mode switching) with algorithmic continuous-time and discrete-time behavior (for example, feedback control or signal conditioning). Users can also create a model of the system and its environment in Simulink® and run hybrid executions to study the interactions between the two.

In Simulink®, a Stateflow® block uses a state diagram to represent an object with a discrete set of modes. These modes are known as states. A Stateflow® chart is a graphical representation of a finite state machine where states and transitions form the building blocks of the system. Stateflow® charts enable the graphical representation of hierarchical and parallel states and the event-driven transitions between them. The Stateflow® finite state machine reacts to events by changing states for the controlled object. A control object can be a motor, a pump, or any device that changes the behavior of the model to control its operation. The behavior of the object depends on what state the object is in and how the object changes from one state to another.

In the specific example application Stateflow®, the modeling process for modeling state-based executions, is embedded in Simulink®. Thus, the execution is invoked by Simulink® or some other time based dynamic modeling application, and does not run independently. In the case of Stateflow®, as execution starts, Simulink® starts its clock. When the execution engine reaches a Stateflow® block, the Simulink® clock stops ticking, and the execution engine passes information to Stateflow®, and awaits a signal back from Stateflow®. Stateflow® then performs its state-based modeling process. Once all the Stateflow® blocks finish their execution, outputs are sent to Simulink®, and the Simulink® clock starts-ticking again. Therefore, during the execution of Stateflow® blocks, the execution is instantaneous, i.e., has no time effect on the Simulink® model. All the events and state transitions that occur in Stateflow® are considered to have taken place at the specific moment in time when the clock stops.

An example of a Stateflow® form of state diagram model is shown in FIG. 2. Each arrow in the Stateflow® diagram also has values like the Simulink® arrows, but these values represent a decision value relating information that can cause one state to transition to another. The arrows in Stateflow® also indicate the direction of the signals. The exemplar Stateflow® diagram as shown in FIG. 2 is embedded in a Simulink® environment as shown in FIG. 3. The Simulink® signals are provided to Stateflow®, and Stateflow® uses this information to decide whether there are changes in states.

More specifically, in operation, a state flowchart 136 diagram is shown in FIG. 2, which corresponds to a detailed description of the flowchart 136 shown in FIG. 3. In FIG. 3, port data temp 158 receives a signal from the output of physical plant 146. Port temp_min 156 receives a value from a constant block 144 in Simulink® as the minimum set point temperature for the physical plant. Data switch 136 receives data from Simulink® constant block 140 or 142 indicating whether the switch should be on or off. Output port speed 160 on the state flowchart is then calculated based on input values 154, 156, and 158. Physical plant 146 receives data from output port speed 160 for further calculations within the physical plant 146. Within the state flowchart 136 as shown in FIG. 2, there are two states: an on state 120 and an off state 122. The default transition 126 determines the initial state is the off state 122. When an on_switch transition 130 is enabled, the enable signal passes to junction 124 and determines whether the temp 158 data is greater or equal to 30, if not, then the enable signal is passed on to signal link 132 and further finish the transition to the on state 120. Now the on state 120 is active and off state 122 inactive. The off state 122 will become active again when the off switch signal 128 is enabled, at which time the on state 120 will be inactive.

One notable difference between Simulink® (and similar dynamic modeling programs) and Stateflow® (and similar state modeling programs) is that Stateflow® models in state changes of discrete events and is implemented within the time-driven environment, whereas Simulink® is modeled in continuous time or discrete time and is the time-driven environment. Said differently, Simulink® is a time-driven engine and Stateflow® is an event-driven engine embedded and initiated in a time-driven environment.

Dynamic systems are typically modeled in execution environments as sets of equations. At any given instant of time, the equations output values that can be considered states, and can also be communicated to state flow modelers. Thus, users conventionally have the ability to model using time-driven equations, and/or event-driven models controlled by time-driven equations. For example, if a user wants to know how fast a school bus is traveling at a specific moment in time, the user can use Simulink® to model the speed of the school bus. If part of the determination of the speed is what gear the school bus transmission is in, the gear indication can be modeled in Stateflow® within the Simulink® speed model.

Stateflow®, and similar state modeling applications, are therefore utilized where the location and exact behavior of objects are not important but actions taken or completed on or by the objects are of interest. Such state flowchart models are currently invoked by the time driven dynamic modeling environments, such as that of Simulink®. Hence, if only a small number of Stateflow® calls are made by Simulink®, delays can be practically non-noticeable.

However, returning to the school bus example, if the user wants to know in the event of an emergency how fast the school children can get off the school bus, then the user must attempt a highly complex combination of time-driven equations and embedded event-driven models in time-driven environments to approximate the movement of each child off the bus. In Simulink®, such a model will also track the exact position of each child, despite the fact that whether a child has progressed one centimeter forward is not the focus of such a model. Regardless, such information must be tracked in the time dependent graphical model. Also, in such a model, the clock time that each child leaves the bus is unimportant. However, the number of children getting off the bus, the intervals between each child getting off the bus, and the position of the child as either remaining on the bus or being safely off the bus, are what is desired to be modeled. Such events are highly complex to model in time-driven model executions and state-based model executions operating in time-driven environments.

Furthermore, if a user wants to model network traffic and to determine how fast a router can relay millions of packets, it is computationally costly to use the state flowchart model within the dynamic block diagram time driven environment because such a configurations require constant calls between programs. Hence, the delay in execution output can be very noticeable, and can even approach the hardware processing limitations and bog down a execution to the point of ineffectiveness.

Accordingly, a modeling application that is event driven, and does not require a continuous time operation to execute, is desired.

SUMMARY OF THE INVENTION

In accordance with one example embodiment of the present invention, the claimed invention provides a method and system for modeling timeout functionality in a graphical discrete event execution environment. The claimed invention relates to situations where an entity in a discrete event model is supposed to complete traveling in one or more blocks but fails to do so in the selected time period. At the end of the selected time period, the timeout function expires.

In accordance with one embodiment of the present invention, in a graphical discrete event execution environment, a method of providing regional timeout functionality is provided. The method includes providing a discrete event model containing a region of components and at least one entity holding at least one value of arbitrary data type, wherein the at least one entity passes through at least one of the components in the region. The method also includes initiating a timeout function associated with the entity upon occurrence of a start condition in the region of components of the discrete event model, wherein the timeout function is configured to expire after a selected time period. The method further includes one of terminating and resetting the timeout function upon occurrence of an end condition in the region of components of the discrete event model.

The timeout functionality is initiated by a start condition. In one aspect of the present invention, a timer is used to time the timeout function upon occurrence of a start condition. In one aspect of the present invention, the start condition is signaled by an entity passing through a port of a block. In accordance with another aspect of the present invention, the start condition is signaled by an entity passing through one of an input, output, and a control port of a block within the discrete event model. In another aspect of the present invention, the start condition is signaled by an entity entering a block of the discrete event model. In yet another aspect of the present invention, the start condition is signaled by an entity exiting a block of the discrete event model. In still another aspect of the present invention, the start condition is a change in signal from a time-based subsystem within the discrete event model. In still another aspect of the present invention, the start condition is a state change in a state-based subsystem within the discrete event model. In accordance with still another aspect of the present invention, the start condition comprises a change of a dataflow-based subsystem within the discrete event model.

The timeout function is terminated by an end condition. In one aspect of the present invention, the termination of the timeout function can be achieved by canceling the timeout function prior to the expiration of the timeout function. In another aspect of the present invention, the termination of the timeout function can be achieved by stopping a timer upon occurrence of the end condition and prior to the expiration of the timeout function. In one aspect of the present invention, the end condition is signaled by reaching the end of the selected time period. In another aspect of the present invention, the end condition is signaled by an entity entering or exiting a block of the discrete event model and the timeout function is cancelled at that time. In yet another aspect of the present invention, the end condition is signaled by an entity passing through a port of a block within the discrete event model and the timeout function is cancelled at that time also. In accordance with another aspect of the present invention, the end condition is signaled by an entity passing through one of an input, output, and a control port of a block within the discrete event model, and the timeout function is cancelled at that time. In still another aspect of the present invention, the end condition is a change in signal from a time-based subsystem within the discrete event model. In still another aspect, the end condition is signaled by a state change in a state-based subsystem within the discrete event model. In accordance with still another aspect of the present invention, the end condition comprises a change of a dataflow-based subsystem within the discrete event model.

The timeout function operates within a region of which the boundaries are marked by a combination of ports or blocks where a start or end condition takes place. Within the region, there can be many different kinds of block configuration. In one aspect of the present invention, the region comprises a plurality of blocks. In another aspect of the present invention, the region comprises a subsystem that contains discrete event model components which are within the discrete event model. In still another aspect of the present invention, the region comprises a hierarchical component of the discrete event model.

In accordance with one aspect of the present invention, an entity is directed to a predetermined location, such as a timeout target, for timeout processing upon expiration of the timeout function. In one aspect of the present invention, the predetermined location is a block. In another aspect of the present invention, the predetermined location is a port of a block. In yet another aspect of the present invention, the predetermined location is a hierarchical location. This hierarchical location can be nested. In accordance with still another aspect of the present invention, timeout processing is initiated on the entity upon expiration of the timeout function, wherein timeout processing is at least one of removing the entity from the discrete event model, ending execution of the discrete event model, and altering entity generation characteristics in the discrete event model.

The discrete event model that models timeout functionality can be simulated under different systems. In accordance with one aspect of the present invention, the discrete event model is a subsystem within a time-based system. In another aspect of the present invention, the discrete event model is a subsystem within a state-based system. In yet another aspect of the present invention, the discrete event model is a subsystem within a dataflow-based system.

The discrete event model that models timeout functionality can also be simulated in conjunction with other models. In one aspect of the present invention, the discrete event model is simulated in conjunction with a time-driven model. In another aspect of the present invention, the discrete event model is simulated in conjunction with a state-driven model. In yet another aspect of the present invention, the discrete event model is simulated in conjunction with a dataflow driven model.

In accordance with another example embodiment of the present invention, a medium in an electronic device for holding computer executable instructions for a method providing regional timeout functionality in a graphical discrete event execution environment is provided. The method includes providing a discrete event model containing a region of components and at least one entity holding at least one value of arbitrary data type, wherein the at least one entity passes through at least one of the components in the region. The method also includes initiating a timeout function associated with the entity upon occurrence of a start condition in the region of components of the discrete event model, wherein the timeout function is configured to expire after a selected time period. The method further includes one of terminating and resetting the timeout function upon occurrence of an end condition in the region of components of the discrete event model.

In accordance with yet another example embodiment of the present invention, a system providing regional timeout functionality in a graphical discrete event execution environment is provided. The system includes an initiator for initiating a timeout function associated with an entity upon occurrence of a start condition in a region of components of a discrete event model, wherein the timeout function is configured to expire after a selected time period and the entity holds at least one value of arbitrary data type and passes through at least one of the components in the region. The system further includes a terminator for one of terminating and resetting the timeout function upon occurrence of an end condition in the region of components of the discrete event model.

The initiator initiates a time out function upon occurrence of a start condition. In one aspect of the present invention, the initiator starts a timer upon occurrence of a start condition. In one aspect of the present invention, the start condition is signaled by an entity passing through a port of a block. In accordance with another aspect of the present invention, the start condition is signaled by an entity passing through one of an input, output, and a control port of a block within the discrete event model. In another aspect of the present invention, the start condition is signaled by an entity entering a block of the discrete event model. In yet another aspect of the present invention, the start condition is signaled by an entity exiting a block of the discrete event model. In still another aspect of the present invention, the start condition is a change in signal from a time-based subsystem within the discrete event model. In still another aspect of the present invention, the start condition is a state change in a state-based subsystem within the discrete event model. In accordance with still another aspect of the present invention, the start condition comprises a change of a dataflow-based subsystem within the discrete event model. In accordance with further aspects of the present invention, the start condition and/or the end condition can include actions by a user, other input to the model, or other external events that are distinct from the model, including conditions triggered by the operating system or by real time.

The terminator terminates a timeout function upon occurrence of an end condition. In one aspect of the present invention, the terminator terminates the timeout function by canceling the timeout function prior to the expiration of the timeout function. In another aspect of the present invention, the terminator terminates the timeout function by stopping a timer upon occurrence of the end condition and prior to the expiration of the timeout function. In one aspect of the present invention, the end condition is signaled by reaching the end of the selected time period. In another aspect of the present invention, the end condition is signaled by an entity entering or exiting a block of the discrete event model and the timeout function is cancelled at that time. In yet another aspect of the present invention, the end condition is signaled by an entity passing through a port of a block within the discrete event model and the timeout function is cancelled at that time also. In accordance with another aspect of the present invention, the end condition is signaled by an entity passing through one of an input, output, and a control port of a block within the discrete event model, and the timeout function is cancelled at that time. In still another aspect of the present invention, the end condition is a change in signal from a time-based subsystem within the discrete event model. In still another aspect, the end condition is signaled by a state change in a state-based subsystem within the discrete event model. In accordance with still another aspect of the present invention, the end condition comprises a change of a dataflow-based subsystem within the discrete event model.

The timeout function operates within a region of which the boundaries are marked by a combination of ports or blocks where a start or end condition takes place. Within the region, there can be many different kinds of block configuration. In one aspect of the present invention, the region comprises a plurality of blocks. In another aspect of the present invention, the region comprises a subsystem that contains discrete event model components which are within the discrete event model. In still another aspect of the present invention, the region comprises a hierarchical component of the discrete event model.

In accordance with one aspect of the present invention, a manager directs an entity to a predetermined location for timeout processing upon expiration of the timeout function. In one aspect of the present invention, the predetermined location is a block. In another aspect of the present invention, the predetermined location is a port of a block. In yet another aspect of the present invention, the predetermined location is a hierarchical location. This hierarchical location can be nested. In accordance with still another aspect of the present invention, the manager initiates timeout processing on the entity upon expiration of the timeout function, wherein timeout processing is at least one of removing the entity from the discrete event model, ending execution of the discrete event model, and altering entity generation characteristics in the discrete event model.

The discrete event model that models timeout functionality can be simulated under different systems. In one aspect of the present invention, the discrete event model is a subsystem within a time-based system. In another aspect of the present invention, the discrete event model is a subsystem within a state-based system. In yet another aspect of the present invention, the discrete event model is a subsystem within a dataflow-based system.

The discrete event model that models timeout functionality can also be simulated in conjunction with other models. In one aspect of the present invention, the discrete event model is simulated in conjunction with a time-driven model. In another aspect of the present invention, the discrete event model is simulated in conjunction with a state-driven model. In yet another aspect of the present invention, the discrete event model is simulated in conjunction with a dataflow driven model.

BRIEF DESCRIPTION OF FIGURES

The illustrative embodiment of the present invention will be described below relative to the following drawings:

FIG. 8 is an illustrative embodiment of a Discrete Event System model environment;

FIG. 9 is an illustrative representation of the Event calendar for use with the present invention;

FIG. 10 is an illustrative embodiment of the event calendar and system model of the present invention;

FIG. 11 is an illustrative embodiment of a Discrete Event System model environment;

FIG. 12 is an illustrative embodiment of the event calendar and system model of the present invention;

FIG. 13 is an illustrative embodiment of a Discrete Event System model environment;

FIG. 19 is an illustrative embodiment of the event calendar of the present invention;

FIG. 20 is an illustrative embodiment of the event of the present invention;

FIG. 21 is an illustrative embodiment of the event calendar containing priority data for use with the present invention;

FIG. 24B illustrates an exemplary subsystem of the block diagram of FIG. 24A that implements hierarchical timeout functionality; and.

DETAILED DESCRIPTION

The present invention introduces a technique to implement timeout functionality in a discrete event system (DES) model. Timeout functionality is associated with an entity and can be initiated or terminated upon occurrence of a start condition or an end condition, respectively. A start condition or an end condition can be one of an entity passing through a port, entering a block and exiting a block. Timeout functionality is configured to expire after a selected time period. After a timeout expires, the entity with the expired timeout is sent for timeout processing.

A discrete event system (DES) modeling environment is one wherein the systems state transitions depend on asynchronous discrete incidents called events. Such an execution differs greatly from a time based execution, such as Simulink®, wherein the execution is time dependent.

Figure 1:
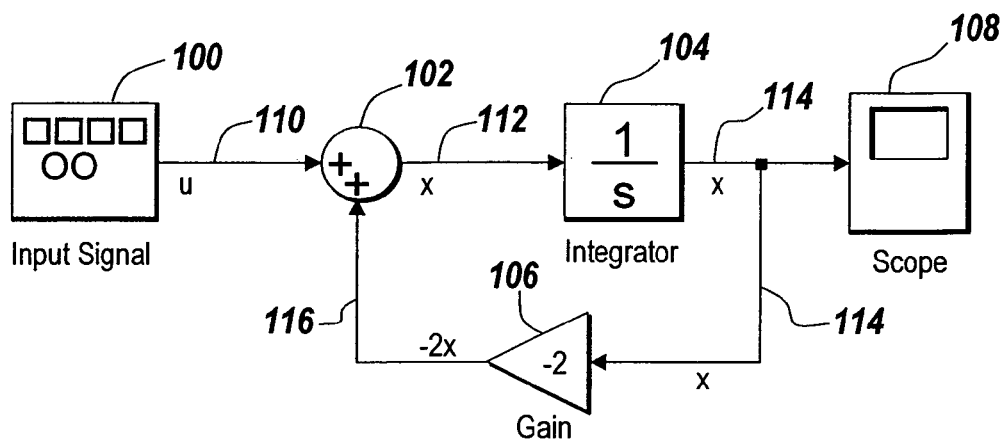
FIG. 1 is an illustrative embodiment of a Simulink® model for use with the present invention.
Figure 2:
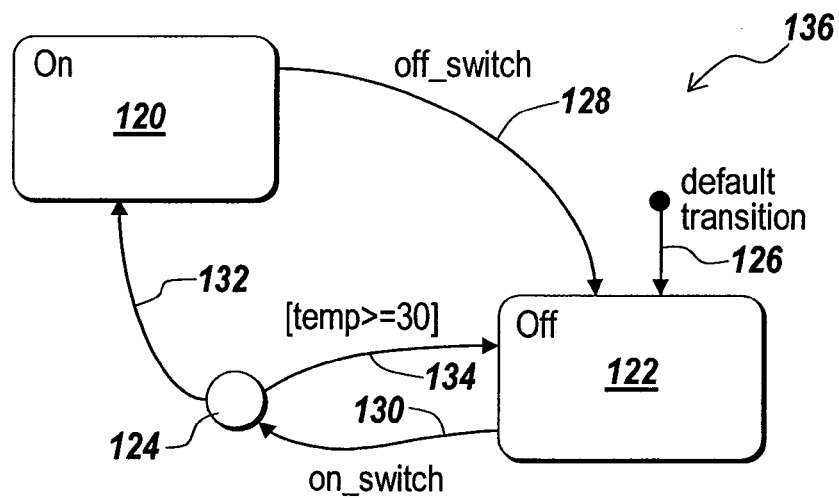
FIG. 2 is an illustrative embodiment of a StateFlow® model for use with the present invention.
Figure 3:
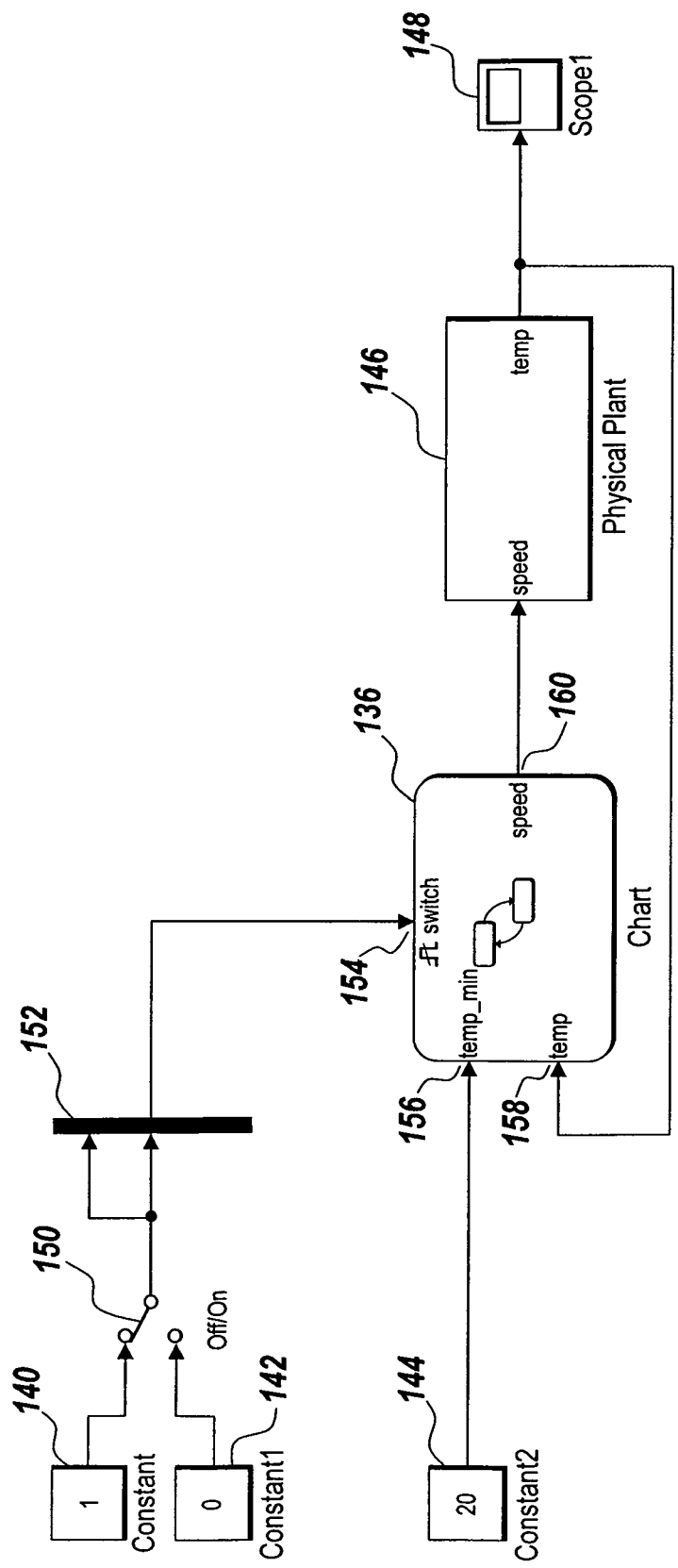
FIG. 3 is a hybrid external environment for use with the present invention.
Figure 4:
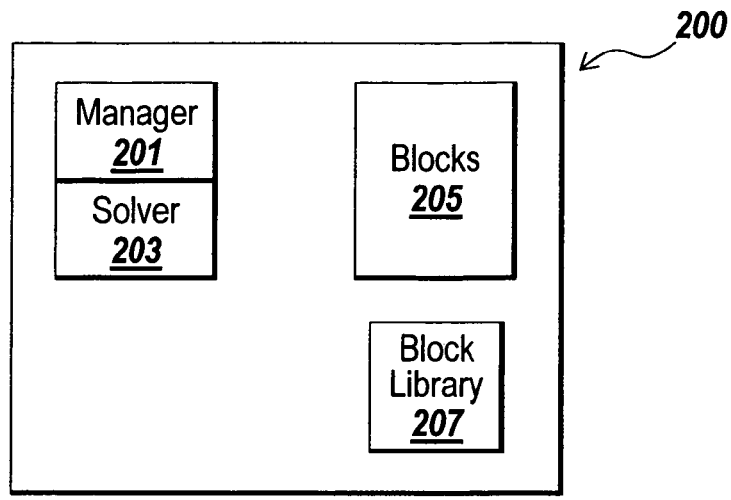
FIG. 4 is an illustrative example of a Discrete Event System model environment for use with the present invention.

In reference to FIG. 4, a DES model environment 200 is provided. The DES model environment 200 includes an event modeling manager 201. The manager 201 coordinates the operation of the DES model environment to process model executions. The manager 201 includes a solver 203, which processes the DES model configured in the DES model environment 200. The manager 201 provides for the implementation of the DES model environment 200 by supporting the creation of DES blocks 205 that represent various aspects of the DES model. The blocks 205 can represent different portions of the model as later described herein. Example blocks include an entity generator, a queue, a server, and a terminator, in addition to other blocks having specific tasks and implementations. A block library 207 can be provided that is customized for operation within the DES environment. Furthermore, the block library in the present DES modeler is not industry specific, thereby providing for numerous user defined applications.

A primary data component within the DES model is referred to as an entity. Entities are abstract representations of areas of interest within the DES model and may vary depending upon that which is being modeled by the DES system. Entities are the items that pass from block to block in the DES modeling environment. For example, when modeling a digital network, an entity may represent a data packet. In another example, when modeling a manufacturing plant, entities may take the form of individual items on the assembly line. Each DES model has at least one entity within the model.

The blocks 205 are interconnected using block connectors that pass entities and other information between blocks. The information can include information from other models or data sources or references that have some contribution to the creation or operation of the entities as they pass through the DES model. The blocks can also have block connectors that pass information out to other models or data sources outside of the DES model.

In operation, the DES model environment 200 makes use of the various blocks to organize and manipulate entities through the DES model. For example, the manager 201 manages the configuration of multiple blocks 205 to form the DES model. Blocks 205 can be placed in the model for entity generation, subsequent entity manipulation, and eventually entity termination. The basic operation of the DES model involves passing the entities through the blocks according to instructions governed by the manager 201 and solver 203. The manager 201 can be represented by an event calendar, wherein the event calendar serves to drive the DES model forward by executing the next scheduled event in the event calendar. The solver 203 in the present invention is a DES specific mechanism which allows for the execution of events in the DES event calendar in light of operations which can occur in the external environment. The solver 203 of the present invention, therefore, is in communication with the external environment and can notify the external environment of events within the DES environment which can affect the semantics of the external environment.

Nominally, an entity contains a set of attributes associated with the entity. However, an entity can contain as few as zero attributes. An attribute can be a field wherein the attribute is named and the attribute type is defined. For example, a field can define the entity type as a Boolean, a real number, an integer number, an enumerated type, a string, a vector, a matrix, a frame, and the like, such that the entity is of arbitrary data type. An arbitrary data type represents an arbitrarily complex structure containing data that may include hierarchical composition. The contained data can be as general as a single bit of information and any sequence of such bits representing characters, numeric values, or any other syntactic and semantic datum. Furthermore, an entity can contain sub-entities. Sub entities can be utilized in numerous operations such as recursive nesting or combining hierarchies.

The generation of entities can be automatic, or can be user-defined. User-defined entities allow users within a specific industry to define those attributes that are specific to their needs. The entity can then be incorporated into a DES model, thereby providing great user flexibility. Entities can further incorporate randomness into their behavior via probability distributions associated with blocks generating each entity. These probability distributions can be representative of the probability of an entity being generated based upon a set of defined variables. Probability distribution can be user defined or can be generated automatically, such that a probability of an event occurring drives entity generation within the model. Furthermore, the generation of a probability distribution may be accomplished utilizing other applications or environments, such as but not limited to the MATLAB® environment or the Simulink® environment.

It should further be noted that there can be a relationship between attributes and random numbers as well. When setting attributes of entities, the user can assign values based on input from separate environments, such as Simulink®, to attributes in passing entities. Such separate environments can allow the values to be drawn from a probability distribution. The separate environment thus allows the attributes to be assigned samples from random variables. These random values can be used to introduce randomness in a controlled way to other parts of the model when they move into those parts of the model.

Figure 5:
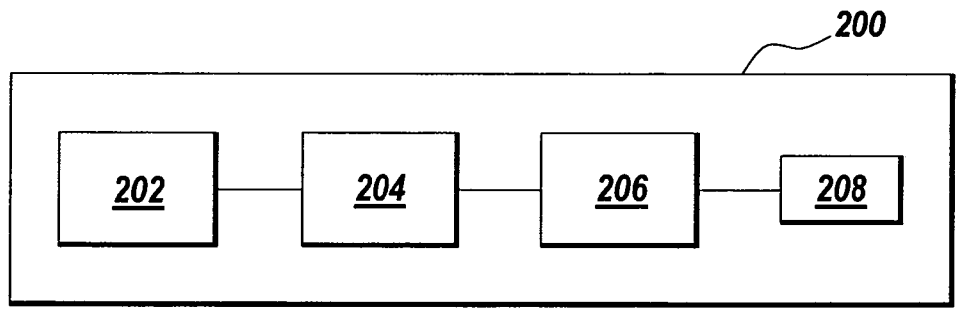
FIG. 5 is an illustrative embodiment of a Discrete Event System model environment.

FIG. 5 depicts a sample DES model environment 200. The present DES model environment includes sources 202 and sinks 208 as depicted in FIG. 5. Sources 202 correspond to those blocks that allow data input into the model, while sinks 208 correspond to those blocks that remove entities from the model. A source 202 in a DES model can take numerous forms. A source 202 can be an entity generator that produces numerous entities at fixed time intervals. Another example of a source 202 is an external operating environment outside of the DES model. For clarity, this external operating environment is not shown on FIG. 5. However, as an example, Simulink® can be used as a source for the present DES modeler, wherein a Simulink signal can trigger the generation of an entity for use in the DES model based upon criteria set by a DES modeler user.

Sinks 208 in a DES model can have functions other than terminating entities, such as returning arbitrary values from entities. A DES sink 208 can display all of the attributes passed to it, or can display a defined set of variables. Sinks 208 for use in the DES modeler of the present invention can also take various forms. One example of a DES modeler sink 208 is a Terminator Block. The Terminator Block can be defined to accept all entities delivered to it, or in the alternative can block all or some entities delivered to it according to selected conditions. Another example of a possible form of sink 208 in the present DES modeler is a Scope Block. The Scope Block can accept an entity and plots data from the entity in a graphical manner. This graphical depiction can allow a user to closely monitor the status of the DES model as well as view numerous trends within the model graphically. A Display Block can also display selected attributes of an entity. Furthermore, a sink 208 in the present invention can be a block which allows the export of a signal from the DES model to an external environment. For example the DES modeler of the present invention can include a block that receives an entity and outputs a Simulink® signal that may be used in a Simulink® environment.

In the present invention, entities generally pass from sources 202 to sinks 208. Entities can, however, traverse numerous intermediate blocks 204, 206 on the pathway from source 202 to sink 208. These intermediate blocks 204, 206 can be represented by numerous specialized DES blocks within the block library of the present DES modeler.

These intermediate blocks can have the same functionality as described above for the sinks. For example, the intermediate blocks can display all of the attributes passed to them, or can display a defined set of variables. The intermediate blocks can have conditions to define which entities can pass through them. Scope Blocks can serve as intermediate blocks that accept an entity and plot data from the entity in a graphical manner. Display Blocks can also display-selected attributes of an entity. Furthermore the intermediate blocks can include blocks that export a signal from the DES model to an external environment, or import a signal or other input information from an external environment.

Figure 6:
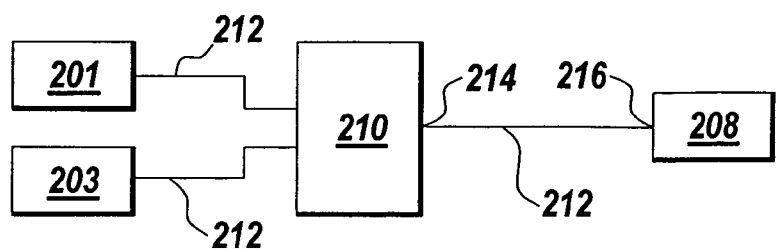
FIG. 6 is an illustrative embodiment of a Discrete Event System model environment.

FIG. 6 depicts an example of an intermediate block utilized in accordance with one embodiment of the present invention. A Routing Block 210 may be placed between a two source blocks 201, 203 such that only a subset of entities is passed to a sink block 208. The subset is determined by the logic of the Routing Block and the data that it uses to determine the path from which the entity is allowed to arrive. Additional intermediate blocks that can be used in accordance with the present invention include, but are not limited to Logical Gates, Queuing Blocks, Storage Blocks, Routing Blocks, Execution Control Blocks, Server Blocks, Resource Allocation Blocks, Timer Blocks, Timeout Blocks, and Delay Blocks. Additionally, the DES environment allows for users to customize and define their own blocks specific to the problem they are modeling and the model they have developed.

The path that an entity takes through the DES modeler environment, as depicted in FIG. 6, is an entity path 212. The entity path 212 is any connection from an entity input port 214 to an entity output port 216 on a block within the DES modeler. For illustrative purposes, these entity paths are represented by a line connecting the entity input 214 and output ports 216 of blocks within the DES model environment. The entity path 212 in the DES model environment is active only when an entity is passing through the entity path 212. At times when there is no entity passing through the entity path 212 in the execution, the entity path has no value associated with it.

Further, there may be associated with each block in a DES environment a state, wherein the state is a persistent data set corresponding to the block. The state variable of a block contains a set of attributes associated with the block (i.e. a Boolean operation, string, parsable string array) and may contain a sub state variable for nesting and combining hierarchies.

Within the DES model of the present invention there can be numerous events. Events are instantaneous occurrences that change a state variable, an output, a future event or any combination thereof. Events are generated at any point at which a block within the DES model acts on an entity. Events can take numerous forms, but by example can include the creation of a new data packet in a network, the exit of a package from loading dock or the placement of an item on a conveyor belt in a manufacturing plant. Each event within a DES model contains four specific characteristics associated with the event. Firstly, each event specifies an entity, namely a set of data associated with the event. Additionally, each event has time data associated with it, defining when the event is scheduled to occur. Events in a DES model can also have a priority associated with their execution, thereby defining the urgency of the event relative to other events that may occur at the same time. Finally, each event has a destination object associated with it, which serves to identify where the event is to take place. The destination object is typically a DES model block but can also be an entity.

Figure 7:
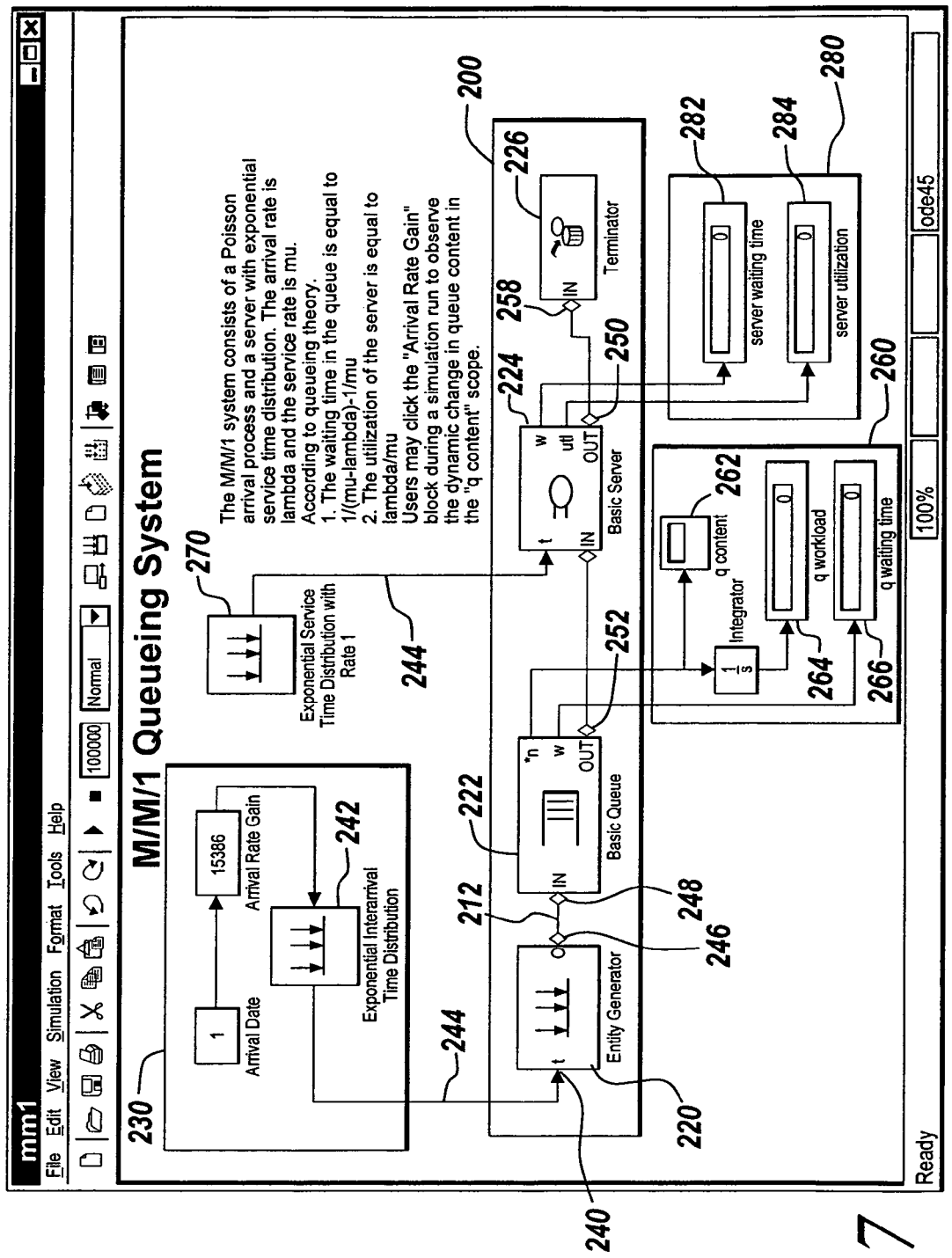
FIG. 7 is an illustrative embodiment of a Discrete Event System model environment in communication with an external environment.

In FIG. 7, a DES environment 200 is denoted. The DES model is capable of communicating with external environments of various forms 230, 260, 270, 280 including such examples application as Simulink® and Stateflow®. The DES model can receive data from these environments 230 and 270 as well as output data to these external environments 260, 280 in accordance with the needs of the user generating the model. Communication with the external environments 230, 270, 260, 280, however, is not necessary, as execution models may be created solely within DES environment that have no interface with environments beyond the DES environment 200.

An entity generator within the DES environment 220 can interface with an external environment 230, such as Simulink®, at port "t" 240 on the entity generator 220. The entity generator block 220 is an example of a source block within DES. The signal transmitted on signal path 244 and received at port "t" 240 is used to control the rate of entity generation by the entity generator 220. Associated with the signal on signal path 244 is a probability distribution provided by the Exponential Interarrival Time Distribution (Simulink®) subsystem 242 within the external environment 230. In light of this probability distribution, a varying signal is presented to the entity generator 220 resulting in the generation of entities in accordance with the probability distribution of the Exponential Interarrival Time Distribution (Simulink®) subsystem 242. Entities generated by the entity generator 220 are passed from the output port of the entity generator 246 to the input port of the queue block 248 over the entity path 212.

The queue block 222 accepts entities and is capable of forwarding them to further associated blocks. In the present example, the entities generated by the entity generator 220 can be forwarded to the server block 224 by the queue block 222 in accordance with user defined values. For example, a user may instruct the queue to hold no more than 10 entities for forwarding. When the queue block 222 has reached capacity, the input port to the queue block 248 may be temporarily disabled thereby preventing the introduction of any more entities to the queue block 222. In such a scenario, the input port of the queue block 248 is defined as unavailable. When the number of entities within the queue block 222 has decreased below the 10 entity limit, the input port to the queue block 248 can be made available, allowing the delivery of additional entities from the entity generator 220 to the queue block 222. Entities within the queue block 222 can be queued based upon the time at which they were generated by the entity generator 220, or can be queued based upon numerous other arrangements. For example, a priority may be associated with various entities, and the queue block 222 may queue entities based upon their priority. Furthermore, as exhibited in FIG. 7, the queue block 222 may interface with an external environment 260 outside of the DES model 200. As illustrated, the queue block 222 has been associated with a scope 262, a first display 264 and a second display 266, thereby allowing a user to graphically view that which is occurring within the queue block 222.

The queue block 222 of the illustrative embodiment can pass entities from the output port of the queue block 252 to an input port 254 of the associated server block 224. The server block 224 can accept entities delivered through the entity path 212 connecting the queue block output 252 to the Server Block input port 254. The Server Block 224 can delay a received entity for a time before passing it to the next associated block, namely the Terminator Block 226. The delay associated with a server is known as a "service time". Service time may be user-defined, or may be based upon an internally or externally generated value. For example, the example embodiment utilizes a Simulink® signal with an associated probability distribution in the Exponential Service Time Distribution with Rate 1 block 270. This results in a variable service time for the server block 224. This variable service time is provided to the Server Block 224 at port 272 of the server block via a signal line 244. While the server block 224 is busy, i.e. during the service time, the server block 224 will make its input port 254 unavailable, thereby preventing the reception of any additional entities. Upon expiration of the service time, the input port to the server block 254 will be made available, thereby allowing the passage of entities once again. Simultaneously, once the service time is completed, the server can pass entities from an output port of the server block 265 to a further associated block. In the present example, this block is a terminator block 226, which is a sink within the DES environment. The terminator block 226 can be user-defined to accept all entities passed to it, or may have other functionality defined by a user. For example, the terminator block 226 may be defined such that it blocks all entities delivered to it, or may produce an error message upon the arriving of an entity. The server block 224 of the illustrated embodiment can further be associated with an external environment 280 external to the DES model. As evidence in the example, the server block 224 can deliver a signal to a first graphical interface 282 and a second graphical interface 284 so that a user can monitor the internal operations of the Server block 224.

In a DES model environment, the DES solver is driven by ordered events, therefore time becomes a secondary variable in the execution. The order of events within a DES model is continually updated in response to changes in the model. Utilizing such an event-driven model, only those points at which an event is scheduled to occur need to be modeled. Time between events, namely "empty time" need not be modeled, thereby resulting in improved efficiency and decreased processor demand.

Events within a DES model are scheduled and managed using an Event Calendar. Unlike a time-based modeling environment, size of the time interval between events is simply the period of time between events. Using the Event Calendar, the DES model can determine when to update the states of certain block in the model, and can also infer when to save time by not updating states. An example of the application of the Event Calendar is best seen by example.

FIG. 8 is an example DES model for use in describing the Event calendar. Assume that the blocks are configured so that the Entity Generator 300 block generates an entity at various times, namely t=0.9 seconds, 1.7 seconds, 3.8 seconds, 3.9 seconds, 6 seconds. Further assume that the queue block 302 has a capacity of 20. Additionally, assume that the server block 304 uses random service times that are uniformly distributed between 0.5 seconds and 2.5 seconds. When the execution first starts, the queue block 302 and server block 304 are both empty. The entity generator block schedules a first event at t=0.9 s. An illustrative example of the event calendar 900 at time t=0.9 is illustrated in FIG. 9.

At t=0.9 seconds, the entity generator block 300 of FIG. 8 creates an entity and attempts to output the entity from the entity generator output 346. Because the queue block 302 is empty, the entity advances from the entity generator block output 346 to the queue block input 348 over the entity path 212 in the model. Since the queue block 302 only has no entity within it, the queue block 302 attempts to output the entity to the next block in the model, namely the server block 304. Because the server block 304 is empty, the entity advances from the queue block 302 to the server block 304. At this moment, the server's entity input port 354 is temporarily unavailable to future entities.

Upon receiving the entity, the server block 304 schedules an event that indicates when the entity's service time is completed. For the purpose of illustration, duration of service of 1.3 seconds is assumed. In light of this, service will be completed at a time of t=2.2 seconds, the sum of the time that the entity enters the server, and the service time.

As set forth previously, a second entity generation event is scheduled at t=1.7 seconds. The event calendar and the associated DES model 403 at a time of t=1.7 seconds is depicted in FIG. 10. The updated Event Calendar 402 is shown, as well as a graphical representation of entity status within the DES model. In FIG. 10, the element marked "e1" 404 signifies the first entity and the dashed arrow 906 serves to indicate the advancement of the first entity 404 from the entity generator block 300 to the queue block 302 and finally to the server block 304.

As evidenced in the Event Calendar at time t=1.7 seconds 902 of FIG. 9, a second entity is to be generated at a time of t=1.7 seconds.

FIG. 11 is an illustrative embodiment of the present invention at a time of t=1.7 seconds 904. At a time of t=1.7 seconds the entity generator block 300 will create an entity "e2" 504 and will attempt to output it. The queue block 302 is empty at this point in time, so the second entity 504 advances from the entity generator 300 to the queue 302 as illustrated in FIG. 11. The advance of the second entity 504 is depicted by the dashed arrow 506.

As depicted in FIG. 12, the newly generated entity "e2" 504 is the only one in the queue block 302. The queue block 302 will therefore attempt to output the second entity 504 to the server block 304. As entity e1 404 remains in the server block 304, the server block's input port 354 is unavailable to receive the second entity 504. The second entity 504 will therefore remain in the queue block 302.

FIG. 12 is an illustrative example of the event calendar at a time of t=3.8 seconds 905. Based upon the original assumptions, the entity generator block will schedule the generation of a third entity (e3) at a time of t=3.8 seconds.

FIG. 13 is an illustrative embodiment of the present invention at a time of t=2.2 seconds 906. At t=2.2 seconds, the server block 304 finishes serving the first entity 404 (i.e. service time is completed) and attempts to output the first entity 404 to the associated terminator block 306. The terminator block 306 is simply a sink that by definition accepts and absorbs all entities. In light of this, the first entity 404 advances from the server block 304 output port 356 to the terminator block 306 input port 358. As the first entity (e1) 404 advances, the server block's 304 entity input port 354 becomes available once again, allowing the queue block 302 to pass the second entity (e2) 504 to the server block 304 via the server block input port 354 via an entity path 212. Upon passing the second entity 504 to the server block 304, the queue block 302 is now empty and the server block 304 becomes busy again. As the server block 304 is busy, the server block's entity input port 354 becomes temporarily unavailable once again.

Figures 14, 15, 16:
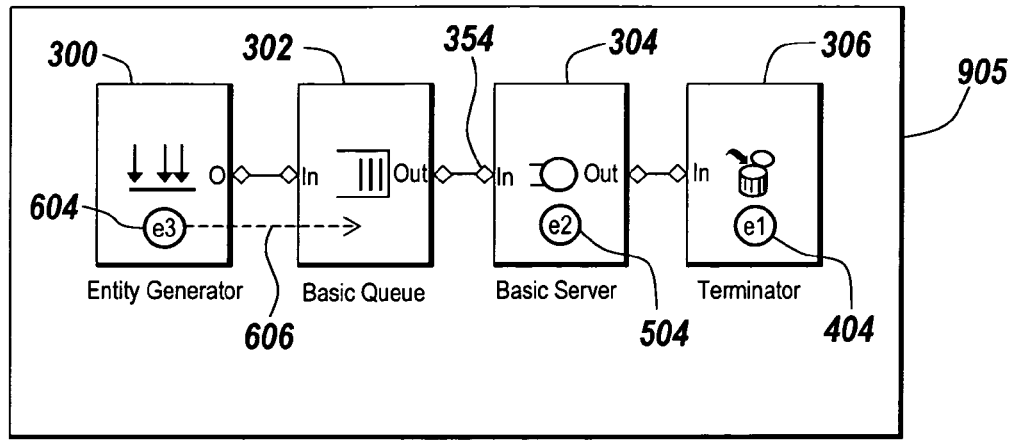
FIG. 14 is an illustrative embodiment of the event calendar and system model of the present invention.
FIG. 15 is an illustrative embodiment of a Discrete Event System model environment.
FIG. 16 is an illustrative embodiment of the event calendar and system model of the present invention.

FIG. 14 is a depiction of the Event Calendar at a service time of t=4.2 seconds 904. The event calendar at time t=4.2 seconds has been generated using the assumption that a service time of t=2.0 seconds has been established for the second entity.

FIG. 15 is a graphical depiction of the DES model at a time of t=3.8 second 905. At t=3.8 seconds, a third entity 604 will be generated by the entity generator block 300. The queue block 302 remains empty, so the third entity 604 advances from the entity generator 300 to the queue block 302. The advancement of the third entity 604 from the entity generator 300 to the queue block 302 is illustrated by the dashed line 606.

Because the third entity 604 is the only one in the queue block 302, the queue block 302 will attempt to output the entity to the server block 304. As set forth above, the server block's input port 354 remains unavailable due to the presence of the second entity 504 in the server block 304, so the third entity 604 will remain in the queue block 302. The queue block's 302 entity output port 352 is said to be blocked because an entity has tried and failed to depart via this port.

FIG. 16 graphically represents the event calendar and the system model at a time of t=3.9 seconds 906.

Figure 17:
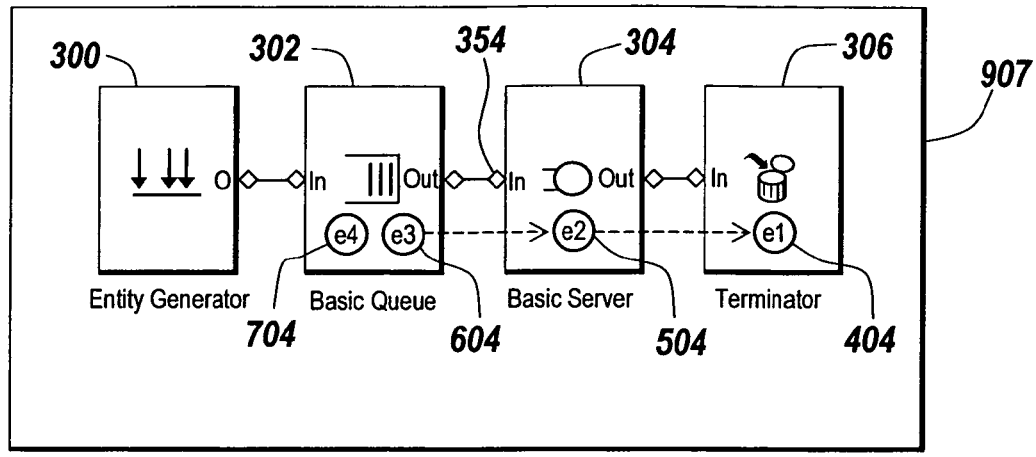
FIG. 17 is an illustrative embodiment of a Discrete Event System model environment.

FIG. 17 is a graphical depiction of the present invention at a time of t=3.9 seconds 907. At t=3.9 seconds, the entity generator 300 schedules the generation of a fourth entity 704. The entity generator 300 will attempt to output the fourth entity 704 to the queue block 302. Since the queue block 302 is not full, the fourth entity 704 will advance from the entity generator block 300 to the queue block 302. The server block's entity input port 354 remains unavailable, therefore the queue block 302 cannot output the fourth entity 704 to the server block 304. The queue length within the Queue Block 302 is two, as depicted in FIG. 17.

Figure 18:
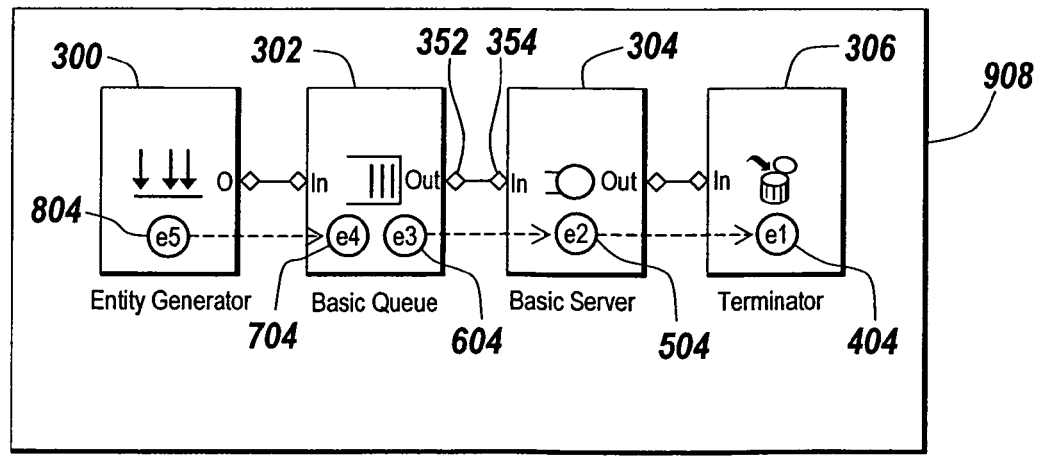
FIG. 18 is an illustrative embodiment of the event calendar and system model of the present invention.

FIG. 18 is a graphical depiction of the DES model and event calendar at a time of t=6.0 seconds. At t=6.0 seconds, a fifth entity 804 is generated by the entity generator 300. At time t=4.2 the server block 304 finishes serving the second entity 504 and attempts to output the second entity 504 to the terminator block 306. The terminator block 306 accepts the second entity 504 and the second entity 504 advances from the server block 304 to the terminator block 306 via a entity path 212. Additionally, the server block's entity input port 354 becomes available, so the queue block's entity output port 352 becomes unblocked. The queue block 302 is now able to output the third entity 604 to the server block 304. The queue length within the queue block 302 has decreased to only one entity, namely the fourth entity 604, and the server block 304 once again becomes busy. The server block's entity input port 354 again becomes temporarily unavailable. The server block 304 will schedules an event on the event calendar that indicates when the entity's service time is completed on the event calendar. For illustrative purposes, 0.7 seconds will be used. The event calendar at a time of t=6 seconds 909 is presented in FIG. 19.

The queue block 302 will attempt to output the fourth entity 704, but the server block's entity input port 354 is unavailable. In light of this, the fourth entity 704 remains in the queue block 302. At the same instant, the queue block's entity output port 352 becomes blocked, prohibiting further attempt to pass the fourth entity 704 to the server block 304 while the server block's input port 354 remains blocked.

Remaining entities within the illustrated model will pass through the model in accordance with the above steps as driven by the event calendar. Additional entities may be placed on the calendar by the entity generator block 300, or no additional entities may be generated and the execution will be complete upon the passage of the fifth entity 804 to the terminator block.

The defined times on the event calendar are inherently important within the DES modeling systems, as events on the event calendar serve as indicators of times at which the systems state is changing. In contrast, times between events on the event calendar are not important to modeling the system, in that at these times the system state remains unchanged. In light of this, the DES modeler skips the static periods and focus on the event times of the event calendar. Such an arrangement offers increased efficiency as compared to a fixed sampling interval.

Additionally, at defined times within the event calendar, multiple states can change instantaneously. For example, at time t=2.2, the server block 304 becomes idle and then busy again. Simultaneously, the queue length also changes because the queue block 302 outputs a first entity 404 to the server block 304.

The illustrative event calendar serves as a convenient example of event processing at discrete time periods within the model. Inherent in advanced modeling of a system, however, is an occurrence of two or more events that are scheduled to occur at the same time instant. Such events are defined as "simultaneous" events and are depicted on a sample event calendar in FIG. 20. The sequential processing of these simultaneous events may be irrelevant or relevant to the execution results; therefore the DES modeler contains numerous methods for determining the proper processing sequence. One such method is the assignment of priority levels to the events.

In FIG. 21, priority values 830, 832 are assigned to the simultaneous events 820, 822 within the event calendar. The relative priorities among the simultaneous events therefore determine their processing sequence within the event calendar. Using a priority value associated with simultaneous events allows a user to decide how various events are related to each other. However, this approach might be inappropriate if a deterministic approach produces a bias that inaccurately reflects the phenomena that a user is modeling. In light of such concerns, a random sequence may be utilized. The random sequence for executing simultaneous events offers the advantage of eliminating bias in the execution, but results in the non-repeatability of the execution should a user run the execution more than once, assuming random number seeds are not utilized.

The DES model of the present invention allows for the transfer of information to various block within the DES model environment, as well as to environments outside of the DES model. For example, as indicated in FIG. 7, the use of a terminator block as a sink may allow for acceptance of all entities within the model. In place of or in conjunction with the terminator block, a scope block may be utilized to accept an entity and plot data from an attribute of the entity.

Data plotted may include a plot of information related to entities experiencing a discrete event or a discrete state. Utilizing a scope block a user can visually verify the operation and performance of a DES model. Additionally, a display block may be associated with the DES model such that the value of an attribute of an entity is graphically displayed. The DES model of the present invention further includes blocks that allow the export of entity attribute values to regions outside of the DES model environment. For example, individual entity priority data may be exported to an external modeling environment such as Simulink®. Control of export of data from this block can take place within the DES model environment, can be controlled by an external environment, or can be a combination of both. In light of this, when modeling complex systems, the DES model of the present invention can be incorporated into other modeling and display applications. In the alternative, the DES model of the present invention can operate in a stand alone configuration, wherein a system to be modeled is modeled solely within the DES model environment.

Figure 22:
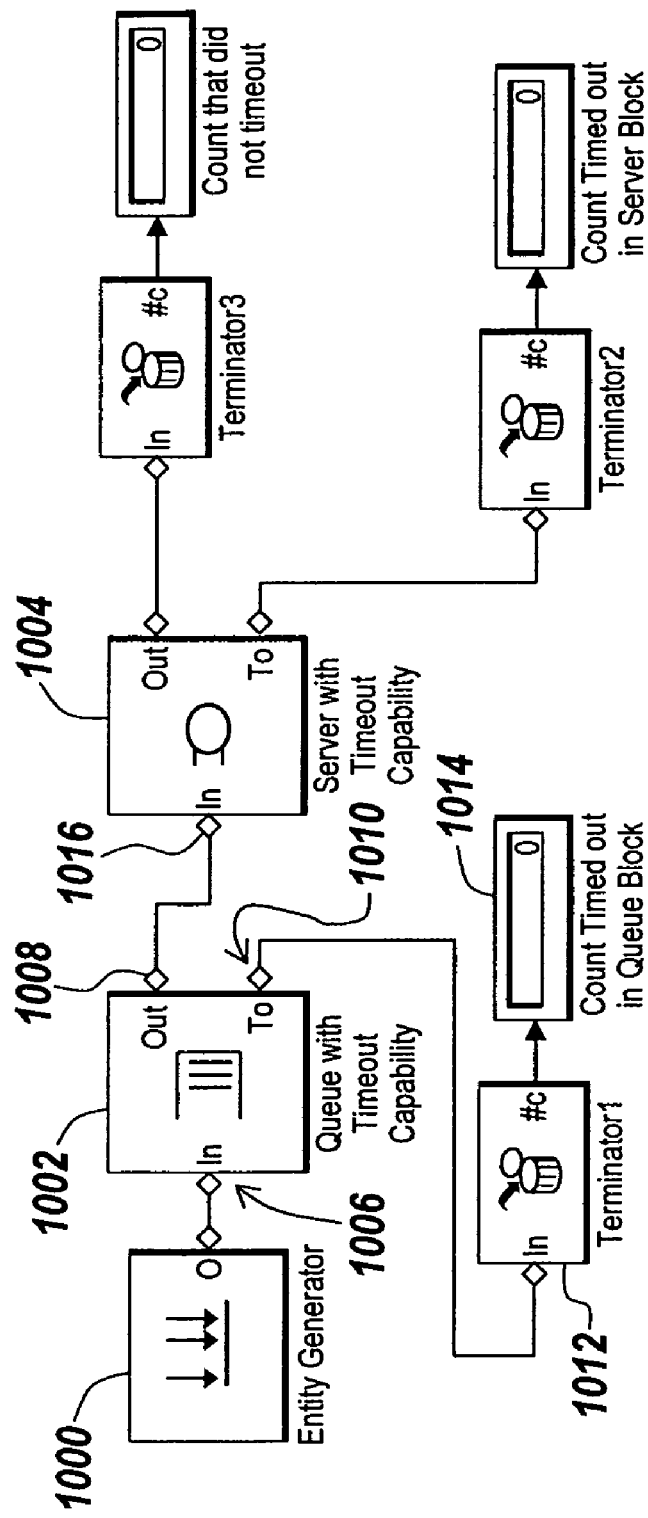
FIG. 22 illustrates an exemplary block diagram showing timeout functionality within a block, in accordance with one aspect of the present invention.

In FIG. 22, an exemplary entity generator 1000 passes entities to queue block 1002 with timeout capability. Queue block 1002 sends entities out via output port 1008 to server block 1004 with timeout capability or via output port 1010 to terminator block 1012. Terminator block 1012 sends entities to a count block 1014 that counts the number of entities with expired timeout functions occurred in the queue block 1002. Server block 1004 can further pass entities to two other terminators.

FIG. 22 illustrates a local timeout context in an exemplary DES model. In accordance with one example embodiment, a local timeout context starts when an entity enters a block that can store entities, such as queue block 1002 with timeout capability. The entity generator 1000 generates entities and passes them to queue block 1002. Upon an entity entering queue block 1002 via the input port 1006, a timeout function starts and upon the entity leaving queue block 1002 via the output port 1008, the timeout function is canceled. Each timeout function is configured to associate with an entity and expire after a selected time period. If the selected time period is reached, and the entity is still in the queue block 1002, the timeout function expires and the entity is sent out of port 1010 and a timeout processing operation can be implemented. Timeout processing may or may not have any logical relationship to the local timeout context. In the illustrative example in FIG. 22, the timeout processing consists of sending the entities to the terminator block 1012 and counting in block 1014 the number of entities that the queue block 1002 sends for timeout processing.

Once an entity leaves queue block 1002 via output port 1008, and upon entry via input port 1016 into server block 1004 with timeout capability, a new timeout function starts. The new timeout function associated with the entity starts in server block 1004 and has no association with the previous timeout function started in queue block 1002. Thus, a timeout function with a local timeout context operates within the boundaries of a single block within the DES model.

Figure 23:
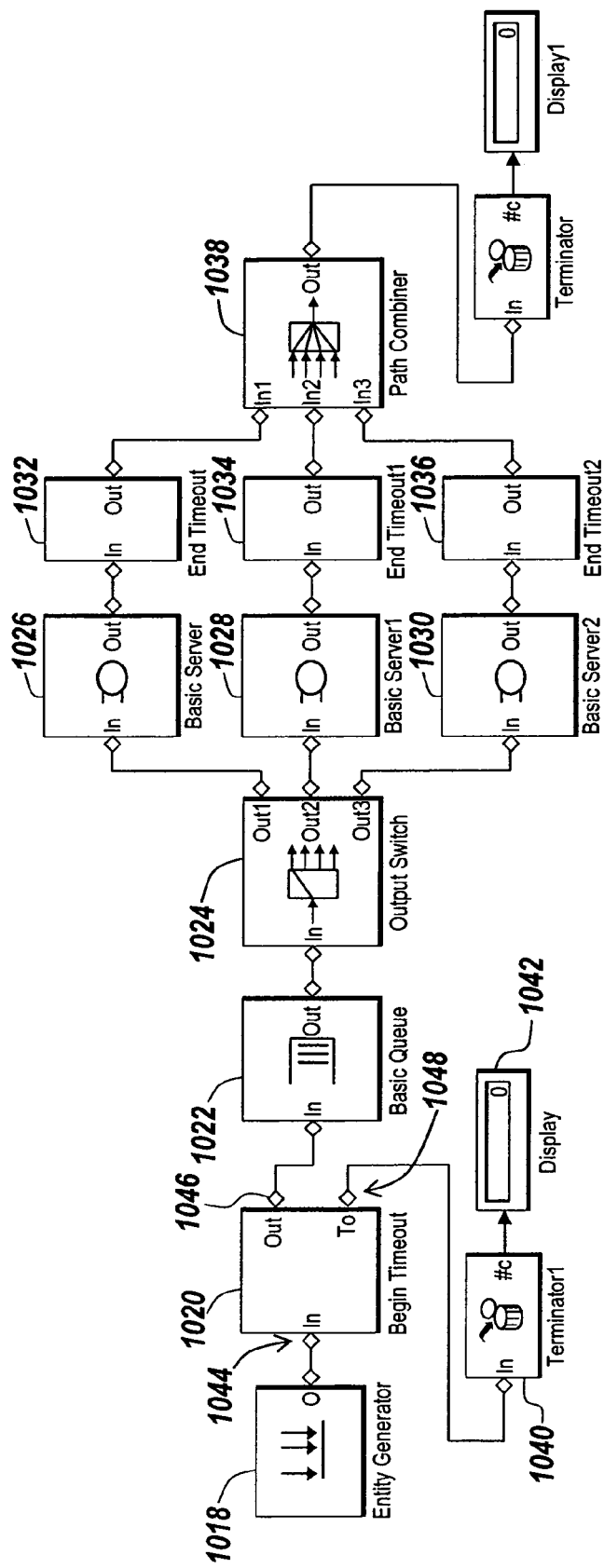
FIG. 23 illustrates an exemplary block diagram showing the timeout functionality within a region, in accordance with one aspect of the present invention.

In FIG. 23, entity generator 1018 passes entities to Begin Timeout block 1020 which outputs entities via output port 1046 to a queue block 1022 or via output port 1048 to terminator block 1040. Terminator block 1040 sends entities to display block 1042. Queue block 1022 sends entities to switch block 1024 and switch block 1024 sends entities to one of a first server block 1026, a second server block 1028 and a third server block 1030. The first server block 1026 can passes entities to a first End Timeout block 1032. The second server block 1028 can passes entities to a second End Timeout block 1034. The third server block 1030 can passes entities to a third End Timeout block 1036. The first, second, and third End Timeout blocks 1032, 1034, 1036 can then send entities to a path combiner 1036, which further sends entities to a terminator block 1040, which updates the count of entities and sends the result to a display block 1042.

FIG. 23 illustrates an exemplary block diagram showing regional timeout functionality. Typically, in a regional timeout context, a timeout function starts when an entity enters a region of blocks marked by a Begin Timeout block. The timeout function is cancelled when the entity passes through an End Timeout block. However, if the timeout function expires before the entity reaches the End Timeout block, the entity is removed from wherever it is and is sent to a block port of a block such as a target of the timeout. A target block can be either a Begin Timeout block, End Timeout block or other target block that sends the entity to its 'TO' port to begin timeout processing. The target block may or may not have a logical relationship with the regional timeout context. In FIG. 23, entity generator 1018 generates entities and passes them to a Begin Timeout block 1020. Upon an entity entering the Begin Timeout block 1020 via input port 1044, a timeout function starts. The entity gets sent out of output port 1046 and enters queue block 1022. The entity must travel from queue block 1022 to switch 1024, and further into one of the first server block 1026, the second server block 1028 and the third server block 1030 before the entity reaches one of the first End Timeout block 1032, the second End Timeout block 1034, and the third End Timeout block 1036. The first, second and third End Timeout blocks 1032, 1034, and 1036 correspond to the first, second, and third server blocks 1026, 1028, and 1030 respectively. Once an entity has reached an End Timeout block, the timeout function is canceled, and the entity is sent to path combiner 1038.

A timeout function with a regional timeout context operates within a region of blocks. If a timeout function expires when the entity is within one of queue block 1022, switch block 1024, the first server block 1026, the second server block 1028 and/or the third server block 1030, the entity is removed from its block location at the time and is sent to block port 1048 of the target block, Begin Timeout block 1020 in this specific example. Timeout processing is started upon the entity being outputted by port 1048. The timeout processing may or may not have any logical relationship to the regional timeout context. In FIG. 23, the timeout processing consists of a terminator block 1040 discarding the entity and a display block 1042 displaying a piece of information about the entity being discarded, or summarized information about all the entities being discarded. In the example instance, block 1042 displays the count of the entities with expired timeout functions.

Figure 24A:
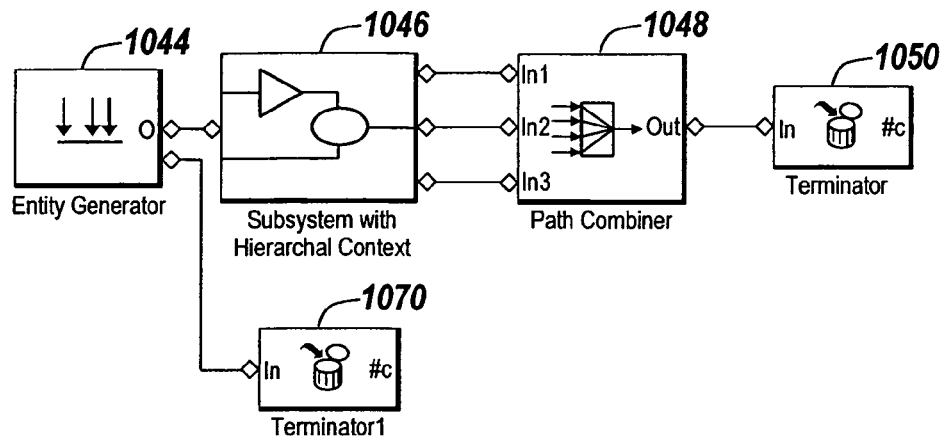
FIG. 24A illustrates an exemplary block diagram of a subsystem with hierarchical timeout functionality, in accordance with one aspect of the present invention.
Figure 24B:
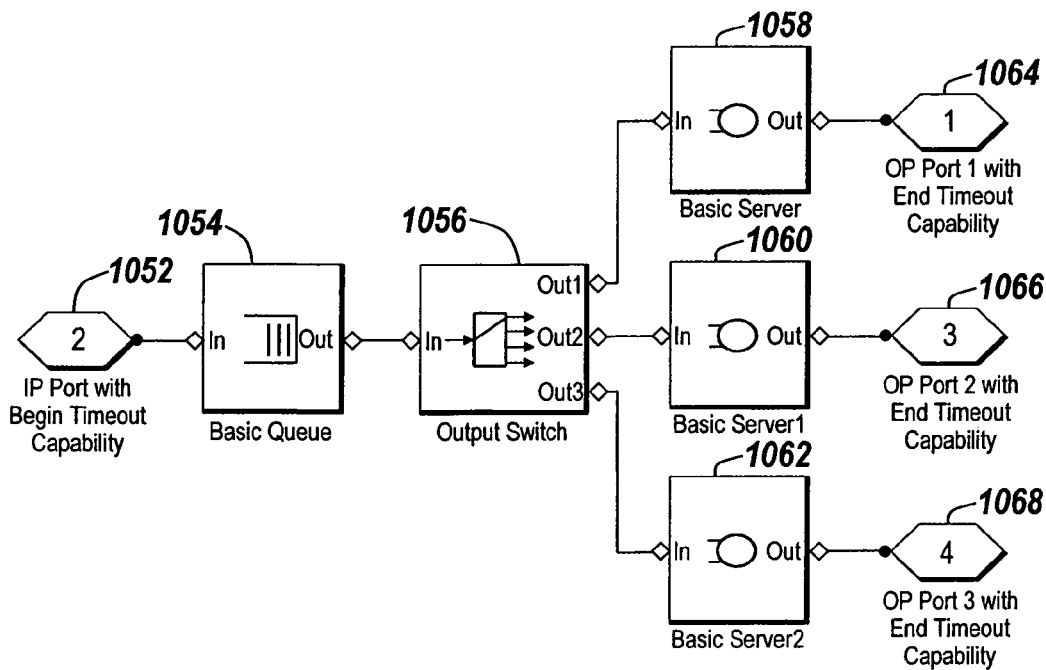

In FIG. 24A, the entity generator 1044 sends entities to subsystem 1046 with hierarchical timeout capability. Subsystem 1046 outputs entities via one of a first output port 1064, a second output port 1066, and a third output port 1068. The first, second and third output ports 1064, 1066, and 1068 further send entities to path combiner 1048, which sends entities to terminator block 1050. In FIG. 24B, entities enter subsystem 1046 via input port 1052 with Begin Timeout capability. Input port 1052 sends entities to queue block 1054, which further passes entities to switch block 1056. Switch block 1056 sends entities to one of a first server block 1058, a second server block 1060, and a third server block 1062. The first, second, and third server block 1058, 1060, and 1062 send entities out of subsystem 1046 via a first output port 1064, a second output port 1066, and a third output port 1068, respectively.

FIG. 24A illustrates an exemplary discrete event model having a hierarchical timeout functionality. FIG. 24A is discussed in conjunction with FIG. 24B which is an exemplary subsystem with timeout capability. A timeout function is initiated when an entity enters the subsystem 1046, and is canceled when the entity leaves the subsystem 1046. In FIG. 24A, entity generator 1044 generates entities and sends them to subsystem 1046. The entity enters the subsystem 1046 via input port 1052 with Begin Timeout capability. A timeout function is initiated when an entity passes through input port 1052. Once the entity enters subsystem 1046, the entity follows a path within subsystem 1046 to reach one of the first output port 1064, the second output port 1066, and the third output port 1068, each output port with End Timeout capability. As an entity passes through one of the first, second and third output ports 1064, 1066 and 1068, the timeout function associated with the entity is cancelled. After an entity exits subsystem 1046, the entity passes through a path combiner 1048 and reaches a terminator block 1050.

In FIG. 24B, the exemplary subsystem consists of the queue block 1054, the switch 1056, the first server block 1058, the second server block 1060, and the third server block 1062. An entity must travel through queue block 1054, switch 1056, and one of the first, second and third server block 1058, 1060, and 1062 before the entity can reach one of the first output port 1064, the second output port 1066, and the third output port 1068 with End Timeout capability. A timeout function having hierarchical timeout functionality operates within a subsystem. If a timeout function expires before the entity reaches one of the first, second and third output ports 1064, 1066, and 1068, the entity is removed from wherever it is in the subsystem and redirected, for example, by manager 201 from FIG. 4, to a target block outside of the subsystem where the timeout function expires. The target block may or may not have a logical relationship with the hierarchical timeout context. The target block can be in a block or another subsystem that is hierarchically above the subsystem that defines the hierarchical timeout context. In the illustrative example, entity generator 1044 is the target block that receives entities that have expired timeout functions, and sends each of the entities for timeout processing. The timeout processing in the illustrative example is a terminator 1070 shown in FIG. 24A. Alternatively, those skilled in the art will appreciate that the subsystem with a hierarchical timeout context can have a special output port that sends each of the entities with expired timeout function for timeout processing. In accordance with the example embodiment describe herein, manager 201 acts as a director that directs where an entity goes upon expiration of its timeout function. Those skilled in the art will appreciate that a hierarchical timeout context is not meant to be limited to a subsystem, and is equally applicable to other hierarchical components.

Figure 25:
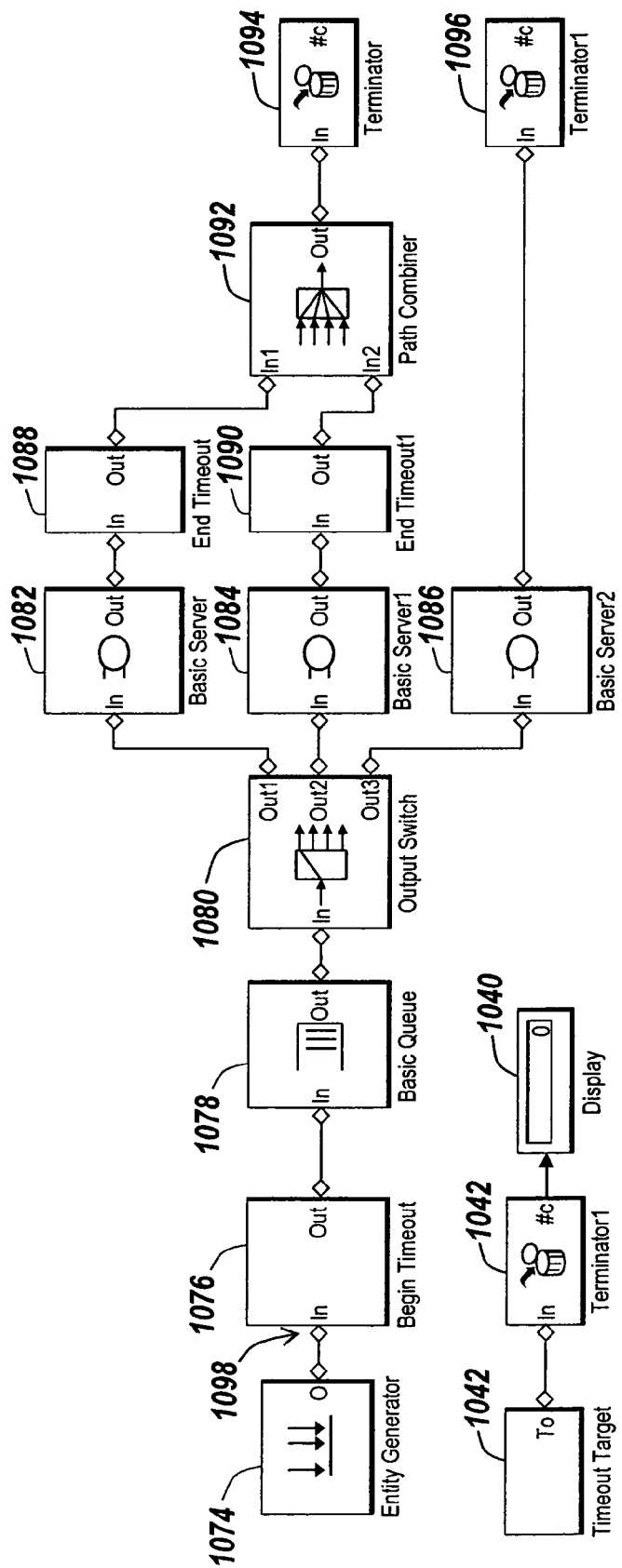
FIG. 25 illustrates an exemplary block diagram showing global timeout functionality, in accordance with one aspect of the present invention.

In FIG. 25, entity generator 1074 sends entities to Begin Timeout block 1076. Terminator block 1042 passes entities to display block 1040. Begin Timeout block 1076 sends entities to queue block 1078. Queue block 1078 further sends entities to switch block 1080. Switch block 1080 passes entities to one of a first server block 1082, a second server block 1084, and a third server block 1086. The third server block 1086 sends entities to terminator 1096. The first and second server blocks 1082 and 1084 pass entities to first End Timeout block 1088, and second End Timeout blocks 1090, respectively. The first and second End Timeout blocks 1088 and 1090 sends entities to path combiner 1092, which further sends entities to terminator block 1094.

FIG. 25 illustrates an exemplary discrete event model with both regional timeout functionality and a global timeout functionality. FIG. 25 contains a block diagram where one of the paths an entity can take only has a Begin Timeout block and no End Timeout block. The timeout context within such a path becomes global to the entire model, and not restricted within a block, a region or a subsystem. In a global timeout context, a timeout function will always expire, unless an entity reaches a terminator block where it exits the model before the timeout function expires. In FIG. 25, entity generator 1074 generates entities and sends them to Begin Timeout block 1076. Upon an entity entering Begin Timeout block 1076 via the input port 1098, a timeout function starts. The entity will travel through queue block 1078 and switch 1080. Switch 1080 will send the entity to one of the first, second and third servers 1082, 1084 and 1086. The first and second servers 1082 and 1086 are each connected to its corresponding first and second End Timeout blocks 1088, 1090, and the timeout function is canceled if the entity passes through one of the first and second End Timeout blocks 1088 and 1090. The timeout context operates in this case as before in a regional context. In FIG. 25, Timeout target block 1042 is where the entities are sent if the timeout function expires in a regional context. In this embodiment, the target block (timeout target block 1042) that outputs entities for timeout processing can be a separate block that is dedicated to only 1) being the 'target' of where an entity goes upon expiration of its timeout function and 2) outputting the entity immediately. Timeout target 1042 sends these entities for a timeout processing at terminator block 1042 and display block 1040.

In FIG. 25, the entities with expired timeout functions in a global context are sent to the same Timeout target block 1101. However, one skilled in the art will recognize that the entities with expired timeout functions in a different context do not need to be sent to the same location, and it is equally valid to send the entities with different timeout contexts to different locations for timeout processing. In FIG. 25, the global timeout context only starts after an entity reaches server block 1086. The entities with expired timeout functions in a global context are sent to timeout target block 1101 by manager 201, and timeout target block 1101 further sends the entities for timeout processing at terminator block 1102 and display 1104. Otherwise, if a timeout function expires in queue block 1078 or switch block 1080, the timeout function is still within a regional context. This global timeout processing may or may not have any logical relationship with either the regional or global timeout context.

One skilled in the art will recognize that the target block that accepts entities from the timeout function and then outputs them for timeout processing may take at least three different forms. In accordance with a first example form, the target block is within the particular timeout context. In accordance with a second example form, the target block is outside of the particular timeout context. In accordance with a third example form, the target block is a separate block not connected to the main model. By way of example, FIGS. 22 and 23 both use the first form to implement the target block that processes entities with expired timeout functions. FIG. 24A uses the second form for implementation of the target block. FIG. 25 uses the third form of the implementation of the target block. One skilled in the art will appreciate that any of the example embodiments illustrated in the FIGS. 22 to 25 can implement the target block in any of the described forms, and other alternative forms not specifically described and illustrated herein.

Figure 26:
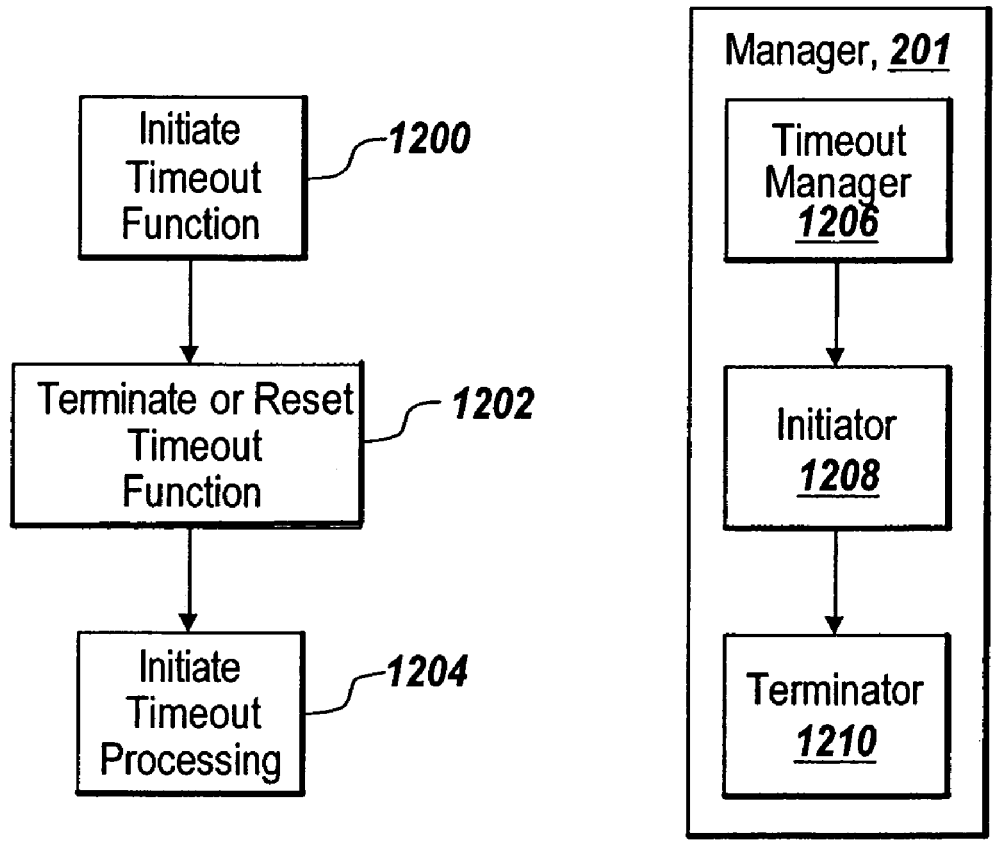
FIG. 26A shows a flowchart depicting example steps taken to practice the present invention.
FIG. 26B illustrates exemplary components within a manager 201 in FIG. 4 to practice the present invention.

FIG. 26A shows a flowchart depicting example steps taken to practice embodiments of the present invention. These steps are applicable to the embodiments of the present invention illustrated in FIGS. 22-25. FIG. 26A is discussed in conjunction with FIG. 26B that illustrates exemplary components within a manager 201 in FIG. 4 to practice the present invention. Initiator 1208 initiates a timeout function in step 1200. The timeout function is initiated upon occurrence of a start condition. In one embodiment of the present invention, the start condition is represented by the entity passing through a port of a block within the DES model. In another embodiment of the present invention, the start condition is represented by the entity passing through one of an input, output, and a control port of a block within the DES model. In yet another embodiment of the present invention, the start condition is represented by the entity entering a block of the DES model and/or the entity exiting a block of the DES model. In still another embodiment of the present invention, the start condition is represented by a signal from a time-based subsystem within the DES model. In yet another embodiment of the present invention, the start condition is represented by a state change of a state-based subsystem within the DES model. One of ordinary skill in the art will recognize that there are many other possibilities of what is representative of a start condition, and the examples mentioned here are not meant to be limiting.

Following Step 1200, terminator 1210 terminates or resets the timeout function in step 1202. The timeout function is terminated or resetted upon occurrence of an end condition. In one embodiment of the present invention, the end condition is represented by the entity passing through a port of a block within the DES model. In another embodiment of the present invention, the end condition is represented by the entity passing through one of an input, output, and a control port of a block within the DES model. In yet another embodiment of the present invention, the end condition is represented by the entity entering a block of the DES model and/or the entity exiting a block of the DES model. In still another embodiment of the present invention, the end condition is represented by a signal from a time-based subsystem within the DES model. In yet another embodiment of the present invention, the end condition is represented by a state change of a state-based subsystem within the DES model. One of ordinary skill in the art will recognize that there are many other possibilities of what is representative of an end condition, and the examples mentioned here are not meant to be limiting. In accordance with further aspects of the present invention, the start condition and/or the end condition can include actions by a user, other input to the model, or other external events that are distinct from the model, including conditions triggered by the operating system or by real time.

Lastly, timeout manager 1206 initiates timeout processing in step 1204. In one embodiment of the present invention, timeout processing is represented by dumping the entity from the execution system. In another embodiment of the present invention, timeout processing is represented by ending the execution of the DES model. In yet another embodiment of the present invention, timeout processing is represented by altering the entity generation characteristics of the DES model. One of ordinary skill in the art will recognize that there are many other possible representatives of timeout processing, so long as it is a process initiated by the cause of an expired timeout function. Accordingly, the examples mentioned here are not meant to be limiting.

Figure 27:
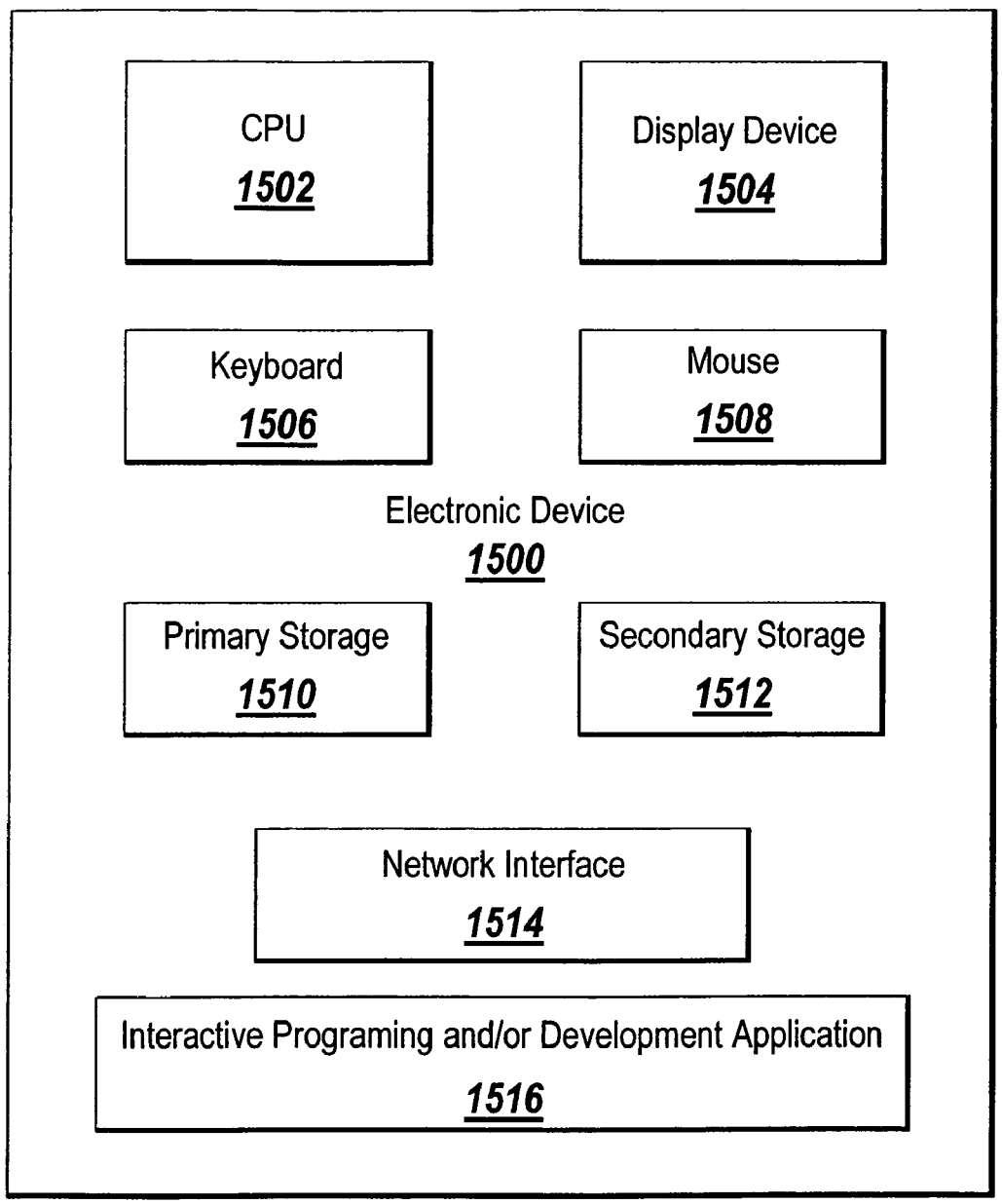
FIG. 27 illustrates an exemplary electronic device suitable for practicing the illustrative embodiment of the present invention.

FIG. 27 illustrates one example embodiment of an electronic device 1500 suitable for practicing the illustrative embodiments of the present invention. The electronic device 1500 is representative of a number of different technologies, such as personal computers (PCs), laptop computers, workstations, personal digital assistants (PDAs), Internet appliances, cellular telephones, and the like. In the illustrated embodiment, the electronic device 1500 includes a central processing unit (CPU) 1502 and a display device 1504. The display device 1504 enables the electronic device 1500 to communicate directly with a user through a visual display. The electronic device 1500 further includes a keyboard 1506 and a mouse 1508. Other potential input devices not depicted include a stylus, trackball, joystick, touch pad, touch screen, and the like. The electronic device 1500 includes primary storage 1510 and secondary storage 1512 for storing data and instructions. The storage devices 1510 and 1512 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 1510 and 1512. The electronic device 1500 can also include a network interface 1514 for communicating with one or more electronic devices external to the electronic device 1500 depicted. A modem is one form of network interface 1514 for establishing a connection with an external electronic device or network. The CPU 1502 has either internally, or externally, attached thereto one or more of the aforementioned components. In addition to applications previously mentioned, a discrete event model execution application 1516, can be installed and operated on the electronic device 1500.

It should be noted that the electronic device 1500 is merely representative of a structure for implementing the present invention. However, one of ordinary skill in the art will appreciate that the present invention is not limited to implementation on only the described device 1500. Other implementations can be utilized, including an implementation based partially or entirely in embedded code, where no user inputs or display devices are necessary. Rather, a processor can communicate directly with another processor or other device.

One skilled in the art will appreciate that any of the discrete event models illustrated in FIGS. 22 to 25 can be a discrete event subsystem within a time-based system or a state-based system. One skilled in the art will also further appreciate that a signal from a time-based system or subsystem and a state-change in a state-based system or subsystem can start a timeout function within a discrete event model. Those skilled in the art will also appreciate that a discrete event model can be simulated in a discrete event execution environment, a time-driven and event-driven hybrid environment, a state-driven and event-driven hybrid environment, a dataflow driven and event-driven hybrid environment. Accordingly, the present invention is not limited to the specific examples provided herein.

We claim:

1. In a graphical discrete event execution environment representing an engineered system by a block diagram model, a computer implemented method of providing regional timeout functionality for a region comprising a plurality of blocks and using ports for communication between blocks, said method comprising the steps of:

providing a discrete event model for the region of blocks and ports having at least one entity holding at least one value of arbitrary data type, the at least one entity passing through at least one of the blocks in the region;

initiating a timeout function associated with the entity upon occurrence of a start condition in the region of blocks and ports within the discrete event model, the timeout function expiring after a selected time period;

terminating or resetting the timeout function upon occurrence of an end condition in the region of blocks and ports within the discrete event model;

initiating timeout processing on the entity upon expiration of the timeout function, the timeout processing comprising at least one of directing the entity to a predetermined location, removing the entity from the discrete event model, ending execution of the discrete event model and altering entity generation characteristics within the discrete event model; and storing timeout processing results on a storage device.

2. The method of claim 1, wherein initiating the timeout function comprises starting a timer upon occurrence of the start condition and timing the selected timeout period.

3. The method of claim 1, wherein the start condition comprises the entity passing through a port of a block in the region within the discrete event model.

4. The method of claim 1, wherein the start condition comprises the entity passing through one of an input port, an output port, and a control port of a block in the region within the discrete event model.

5. The method of claim 1, wherein the start condition comprises at least one of the entity entering a block within the discrete event model and the entity exiting a block within the discrete event model.

6. The method of claim 1, wherein the start condition comprises at least one of the entity entering a block within the discrete event model and the entity exiting the same block within the discrete event model.

7. The method of claim 1, wherein the start condition comprises a change in signal from a time-based subsystem within the discrete event model.

8. The method of claim 1, wherein the start condition comprises a state change of a state-based subsystem within the discrete event model.

9. The method of claim 1, wherein the start condition comprises a change of a dataflow-based subsystem within the discrete event model.

10. The method of claim 1, wherein terminating the timeout function comprises stopping a timer upon occurrence of the end condition and prior to reaching the selected time period.

11. The method of claim 1, wherein terminating the timeout function comprises canceling the timeout function prior to reaching the selected time period.

12. The method of claim 1, wherein the end condition comprises reaching the end of the selected time period.

13. The method of claim 1, wherein the end condition comprises at least one of the entity entering a block within the discrete event model and the entity exiting a block within the discrete event model.

14. The method of claim 1, wherein the end condition comprises at least one of the entity entering a block within the discrete event model and the entity exiting the same block within the discrete event model.

15. The method of claim 1, wherein the end condition comprises the entity passing through a port of a block in the region within the discrete event model.

16. The method of claim 1, wherein the end condition comprises the entity passing through one of an input port, an output port, and a control port of a block in the region within the discrete event model.

17. The method of claim 1, wherein the end condition comprises the entity exiting the discrete event model.

18. The method of claim 1, wherein the end condition comprises a change in signal from a time-based subsystem within the discrete event model.

19. The method of claim 1, wherein the end condition comprises a state change of a state-based subsystem within the discrete event model.

20. The method of claim 1, wherein the end condition comprises a change of a dataflow-based subsystem within the discrete event model.

21. The method of claim 1, wherein the region comprises a subsystem that contains a plurality of blocks and ports within the discrete event model.

22. The method of claim 1, wherein the region comprises a hierarchical component that contains a plurality of blocks and ports within the discrete event model.

23. The method of claim 1, wherein the predetermined location is a block.

24. The method of claim 1, wherein the predetermined location is a port of a block.

25. The method of claim 1, wherein the predetermined location is in a hierarchical component.

26. The method of claim 25, wherein the hierarchical component is nested.

27. The method of claim 1, wherein the discrete event model represents a subsystem within at least one of a time-based system, a state-based system and a dataflow-based system.

28. The method of claim 1, wherein the discrete event model is simulated in conjunction with at least one of a time-driven model, a state-driven model, and a dataflow driven model.

29. In a graphical discrete event execution environment representing an engineered system by a block diagram model, a system providing regional timeout functionality for a region comprising a plurality of blocks and using ports for communication between blocks, said system comprising:

at least one processor and a memory;

a modeler for providing a discrete event model for the region of blocks and ports having at least one entity holding at least one value of arbitrary data type, the at least one entity passing through at least one of the blocks in the region;

an initiator for initiating a timeout function associated with an entity upon occurrence of a start condition in the region of blocks and ports within a discrete event model, the timeout function expiring after a selected time period;

a terminator for terminating or resetting the timeout function upon occurrence of an end condition in the region of blocks and ports within the discrete event model;

a timeout processing module for initiating timeout processing on the entity upon expiration of the timeout function, the timeout processing comprising at least one of directing the entity to a predetermined location, removing the entity from the discrete event model, ending execution of the discrete event model and altering entity generation characteristics within the discrete event model; and a storage device for storing timeout processing results.

30. The system of claim 29, wherein initiating the timeout function comprises starting a timer upon occurrence of the start condition and timing the selected timeout period.

31. The system of claim 29, wherein the start condition comprises the entity passing through a port of a block in the region within the discrete event model.

32. The system of claim 29, wherein the start condition comprises the entity passing through one of an input port, an output port, and a control port of a block in the region within the discrete event model.

33. The system of claim 29, wherein the start condition comprises at least one of the entity entering a block within the discrete event model and the entity exiting a block within the discrete event model.

34. The system of claim 29, wherein the start condition comprises at least one of the entity entering a block within the discrete event model and the entity exiting the same block within the discrete event model.

35. The system of claim 29, wherein the start condition comprises a change in signal from a time-based subsystem within the discrete event model.

36. The system of claim 29, wherein the start condition comprises a state change of a state-based subsystem within the discrete event model.

37. The system of claim 29, wherein the start condition comprises a change of a dataflow-based subsystem within the discrete event model.

38. The system of claim 29, wherein terminating the timeout function comprises stopping a timer upon occurrence of the end condition and prior to reaching the selected time period.

39. The system of claim 29, wherein terminating the timeout function comprises canceling the timeout function prior to reaching the end of the selected time period.

40. The system of claim 29, wherein the end condition comprises reaching the selected time period.

41. The system of claim 29, wherein the end condition comprises at least one of the entity entering a block within the discrete event model and the entity exiting a block within the discrete event model.

42. The system of claim 29, wherein the end condition comprises at least one of the entity entering a block within the discrete event model and the entity exiting the same block within the discrete event model.

43. The system of claim 29, wherein the end condition comprises the entity passing through a port of a block in the region within the discrete event model.

44. The system of claim 29, wherein the end condition comprises the entity passing through one of an input port, an output port, and a control port of a block in the region within the discrete event model.

45. The system of claim 29, wherein the end condition comprises the entity exiting the discrete event model.

46. The system of claim 29, wherein the end condition comprises a change in signal from a time-based subsystem within the discrete event model.

47. The system of claim 29, wherein the end condition comprises a state change of a state-based subsystem within the discrete event model.

48. The system of claim 29, wherein the end condition comprises a change of a dataflow-based subsystem within the discrete event model.

49. The system of claim 29, wherein the region comprises a subsystem that contains a plurality of blocks and ports within the discrete event model.

50. The system of claim 29, wherein the region comprises a hierarchical component that contains a plurality of blocks and ports within the discrete event model.

51. The system of claim 29, wherein the predetermined location is a block.

52. The system of claim 29, wherein the predetermined location is a port of a block.

53. The system of claim 29, wherein the predetermined location is in a hierarchical component.

54. The system of claim 53, wherein the hierarchical component is nested.

55. The system of claim 29, wherein the discrete event model represents a subsystem within at least one of a time-based system, a state-based system and a dataflow-based system.

56. The system of claim 29, wherein the discrete event model is simulated in conjunction with at least one of a time-driven model, a state-driven model, and a dataflow driven model.

57. In a graphical discrete event execution environment representing an engineered system by a block diagram model, a computer readable medium storing computer executable instructions which when executed on a computer provide regional timeout functionality for a region comprising a plurality of blocks and using ports for communication between blocks, said instructions including:

instructions for providing a discrete event model for the region of blocks and ports having at least one entity holding at least one value of arbitrary data type, the at least one entity passing through at least one of the blocks in the region;

instructions for initiating a timeout function associated with the entity upon occurrence of a start condition in the region of blocks and ports within the discrete event model, the timeout function expiring after a selected time period;

instructions for terminating or resetting the timeout function upon occurrence of an end condition in the region of blocks and ports within the discrete event model;

instructions for initiating timeout processing on the entity upon expiration of the timeout function, the timeout processing comprising at least one of directing the entity to a predetermined location, removing the entity from the discrete event model, ending execution of the discrete event model and altering entity generation characteristics within the discrete event model; and instructions for storing timeout processing results on a storage device.

58. The computer readable medium of claim 57, wherein initiating the timeout function comprises starting a timer upon occurrence of the start condition and timing the selected timeout period.

59. The computer readable medium of claim 57, wherein the start condition comprises the entity passing through a port of a block in the region within the discrete event model.

60. The computer readable medium of claim 57, wherein the start condition comprises the entity passing through one of an input port, an output port, and a control port of a block in the region within the discrete event model.

61. The computer readable medium of claim 57, wherein the start condition comprises at least one of the entity entering a block within the discrete event model and the entity exiting a block within the discrete event model.

62. The computer readable medium of claim 57, wherein the start condition comprises at least one of the entity entering a block within the discrete event model and the entity exiting the same block within the discrete event model.

63. The computer readable medium of claim 57, wherein the start condition comprises a change in signal from a time-based subsystem within the discrete event model.

64. The computer readable medium of claim 57, wherein the start condition comprises a state change of a state-based subsystem within the discrete event model.

65. The computer readable medium of claim 57, wherein the start condition comprises a change of a dataflow-based subsystem within the discrete event model.

66. The computer readable medium of claim 57, wherein terminating the timeout function comprises stopping a timer upon occurrence of the end condition and prior to reaching the selected time period.

67. The computer readable medium of claim 57, wherein terminating the timeout function comprises canceling the timeout function prior to reaching the selected time period.

68. The computer readable medium of claim 57, wherein the end condition comprises reaching the end of the selected time period.

69. The computer readable medium of claim 57, wherein the end condition comprises at least one of the entity entering a block within the discrete event model and the entity exiting a block within the discrete event model.

70. The computer readable medium of claim 57, wherein the end condition comprises at least one of the entity entering a block within the discrete event model and the entity exiting the same block within the discrete event model.

71. The computer readable medium of claim 57, wherein the end condition comprises the entity passing through a port of a block in the region within the discrete event model.

72. The computer readable medium of claim 57, wherein the end condition comprises the entity passing through one of an input port, an output port, and a control port of a block in the region within the discrete event model.

73. The computer readable medium of claim 57, wherein the end condition comprises the entity exiting the discrete event model.

74. The computer readable medium of claim 57, wherein the end condition comprises a change in signal from a time-based subsystem within the discrete event model.

75. The computer readable medium of claim 57, wherein the end condition comprises a state change of a state-based subsystem within the discrete event model.

76. The computer readable medium of claim 57, wherein the end condition comprises a change of a dataflow-based subsystem within the discrete event model.

77. The computer readable medium of claim 57, wherein the region comprises a subsystem that contains a plurality of blocks and ports within the discrete event model.

78. The computer readable medium of claim 57, wherein the region comprises a hierarchical component that contains a plurality of blocks and ports within the discrete event model.

79. The computer readable medium of claim 57, wherein the predetermined location is a block.

80. The computer readable medium of claim 57, wherein the predetermined location is a port of a block.

81. The computer readable medium of claim 57, wherein the predetermined location is in a hierarchical component.

82. The computer readable medium of claim 81, wherein the hierarchical component is nested.

83. The computer readable medium of claim 57, wherein the discrete event model represents a subsystem within one of a time-based system, a state-based system and a dataflow-based system.

84. The computer readable medium of claim 57, wherein the discrete event model is simulated in conjunction with at least one of a time-driven model, a state-driven model and a dataflow driven model.

* * * * *

UNITED STATES PATENT AND TRADEMARK OFFICE
CERTIFICATE OF CORRECTION

| | | |
|---|---|---|
| PATENT NO. | : 7,369,977 B1 | Page 1 of 1 |
| APPLICATION NO. | : 11/010148 | |
| DATED | : May 6, 2008 | |
| INVENTOR(S) | : Michael I. Clune et al. | |

It is certified that error appears in the above-identified patent and that said Letters Patent is hereby corrected as shown below:

In the Title page, Item [57] in the abstract section, in the printed patent, at line 1, please change "A system and method" to --A system and method that--

In the specification, in the background section, at column 2, line number 29, in the printed patent, please change "They" to --The--

In the specification, in the background section, at column 6, line number 2, in the printed patent, please change "a" to --an--

In the specification, in the background section, at column 7, line number 66, in the printed patent, please change "wherein the" to --wherein--

Signed and Sealed this

Seventeenth Day of February, 2009

JOHN DOLL
*Acting Director of the United States Patent and Trademark Office*